US012634074B2

(12) United States Patent
Xu et al.

(10) Patent No.: US 12,634,074 B2
(45) Date of Patent: May 19, 2026

(54) METHOD AND APPARATUS FOR DETERMINING PHASE TRACKING REFERENCE SIGNAL PATTERN

(71) Applicant: HUAWEI TECHNOLOGIES CO., LTD., Guangdong (CN)

(72) Inventors: Minghui Xu, Shenzhen (CN); Fengwei Liu, Chengdu (CN); Xi Zhang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 412 days.

(21) Appl. No.: 18/476,348

(22) Filed: Sep. 28, 2023

(65) Prior Publication Data

US 2024/0039668 A1     Feb. 1, 2024

Related U.S. Application Data

(63) Continuation of application No. PCT/CN2022/086485, filed on Apr. 13, 2022.

(30) Foreign Application Priority Data

Apr. 27, 2021     (CN) .......................... 202110460528.7

(51) Int. Cl.
*H04W 72/04*     (2023.01)
*H04L 5/00*     (2006.01)
     (Continued)

(52) U.S. Cl.
CPC .......... *H04L 5/0048* (2013.01); *H04L 5/0007* (2013.01)

(58) Field of Classification Search
None
See application file for complete search history.

(56) References Cited

U.S. PATENT DOCUMENTS

2018/0367277 A1*  12/2018  Zhang .................... H04L 5/0048
2019/0296877 A1*   9/2019  Zhang .................... H04L 5/0048
(Continued)

FOREIGN PATENT DOCUMENTS

WO       2019215754 A2    11/2019

OTHER PUBLICATIONS

Huawei (R1-1704240, Further details for PT-RS design, Apr. 3-7, 2017) (Year: 2017).*

*Primary Examiner* — Maharishi V Khirodhar

(57) ABSTRACT

This application provides a method and an apparatus for determining a phase tracking reference signal (PTRS) pattern. The method includes: A terminal device receives first scheduled bandwidth threshold information from a network device, where a first scheduled bandwidth threshold indicated by the first scheduled bandwidth threshold information meets a first condition, and the first condition is that a ratio of a total quantity of modulation symbols in a PTRS pattern determined based on the first scheduled bandwidth threshold to a quantity of subcarriers in scheduled bandwidth is less than or equal to a first threshold; and determines a PTRS pattern on one orthogonal frequency division multiplexing (OFDM) symbol in an OFDM signal based on the scheduled bandwidth threshold. In this application, the network device configures, for the terminal device, the scheduled bandwidth threshold that meets the first condition, to ensure demodulation performance of the device.

6 Claims, 7 Drawing Sheets

(51) Int. Cl.
    *H04W 76/00*     (2018.01)
    *H04W 88/08*     (2009.01)

(56)         References Cited

U.S. PATENT DOCUMENTS

| | | | |
|---|---|---|---|
| 2020/0021470 A1* | 1/2020 | Sun | H04L 27/26025 |
| 2020/0076647 A1 | 3/2020 | Zhang et al. | |
| 2022/0109539 A1* | 4/2022 | Zewail | H04L 5/0048 |

* cited by examiner

System
100 eMBB

Multi-site
transmission

Backhaul

D2D

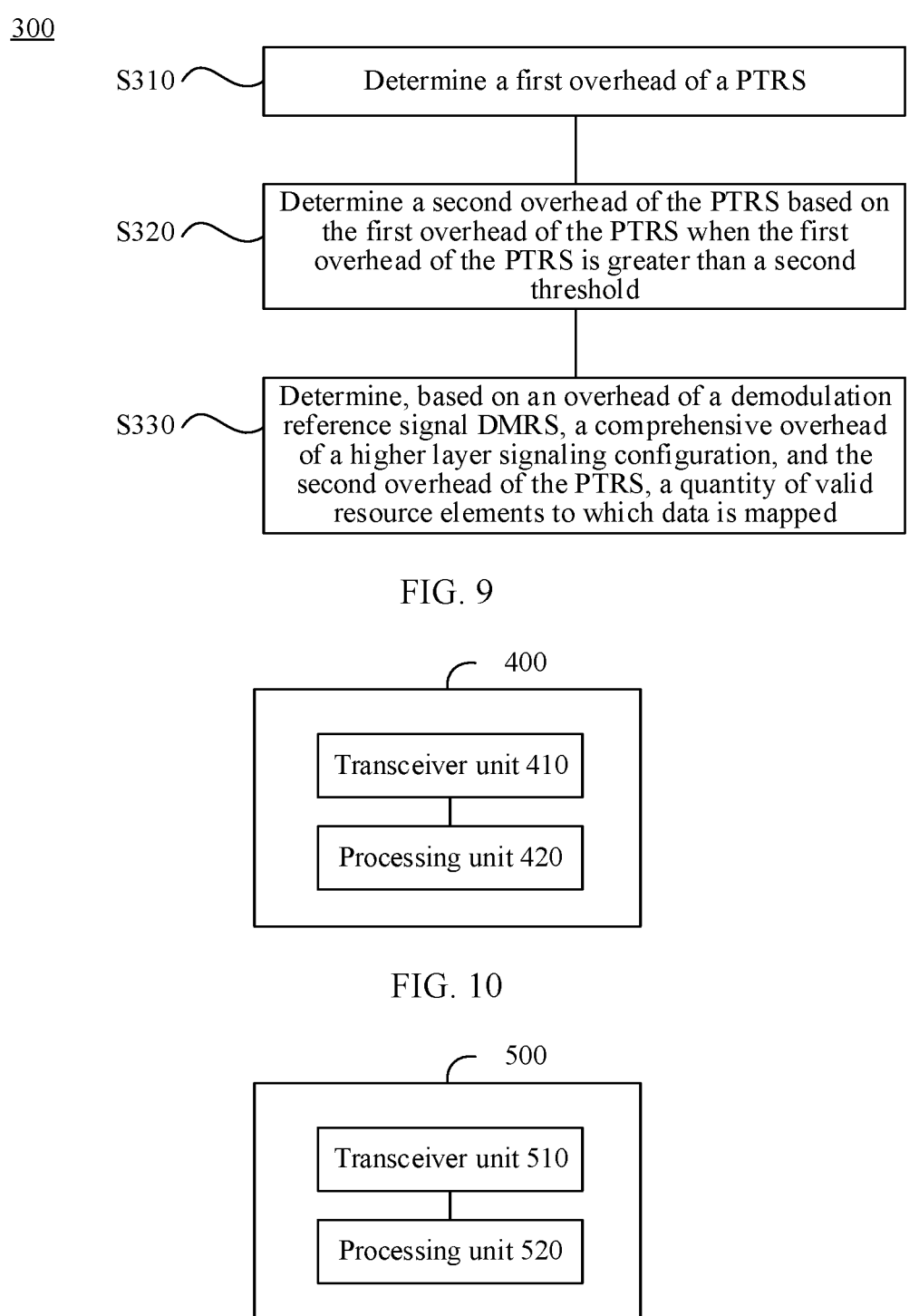

300

S310 — Determine a first overhead of a PTRS

S320 — Determine a second overhead of the PTRS based on the first overhead of the PTRS when the first overhead of the PTRS is greater than a second threshold S330 — Determine, based on an overhead of a demodulation reference signal DMRS, a comprehensive overhead of a higher layer signaling configuration, and the second overhead of the PTRS, a quantity of valid resource elements to which data is mapped

Transceiver unit 410

Processing unit 420

Transceiver unit 510

Processing unit 520

METHOD AND APPARATUS FOR DETERMINING PHASE TRACKING REFERENCE SIGNAL PATTERN

CROSS-REFERENCE TO RELATED APPLICATIONS

This application is a continuation of International Application No. PCT/CN2022/086485, filed on Apr. 13, 2022, which claims priority to Chinese Patent Application No. 202110460528.7, filed on Apr. 27, 2021. The disclosures of the aforementioned applications are hereby incorporated by reference in their entireties.

TECHNICAL FIELD

This application relates to the communication field, and more specifically, to a method and an apparatus for determining a phase tracking reference signal (PTRS) pattern.

BACKGROUND

A high frequency (a frequency band higher than 6 GHz, including 28 GHz, 39 GHz, 60 GHz, 73 GHz, and the like) has abundant frequency band resources, and has become a research and development hotspot. The high frequency is characterized by an antenna array with high bandwidth and high integration, to achieve a high throughput, but also brings a severe intermediate radio frequency distortion problem. For example, phase noise (PHN), a carrier frequency offset (CFO), and a Doppler frequency shift all cause a phase error. As a result, performance of a high-frequency communication system deteriorates or even the high-frequency communication system fails to work.

The phase noise is used as an example. As a frequency band increases, a phase noise power spectral density becomes higher, causing greater impact on a received signal. To be specific, when the frequency band is high, the phase noise deteriorates, causing poorer demodulation performance. Therefore, in a new radio (NR) protocol, a phase tracking reference signal (PTRS) is introduced for both a cyclic prefix orthogonal frequency division multiplexing (CP-OFDM) waveform and a discrete Fourier transformation spread orthogonal frequency division multiplexing (DFT-s-OFDM) waveform, to compensate for the phase noise and improve the demodulation performance in a phase noise condition. How to improve spectral efficiency while introducing the PTRS is a problem studied in this application.

SUMMARY

This application provides a method and an apparatus for determining a phase tracking reference signal (PTRS) pattern. A scheduled bandwidth threshold that meets a condition is configured or a PTRS pattern that meets a condition is determined, to ensure demodulation performance of a network device and a terminal device, and further improve spectral efficiency.

According to a first aspect, a method for determining a phase tracking reference signal (PTRS) pattern is provided. The method may be performed by a terminal device, or may be performed by a chip or a circuit disposed in the terminal device. This is not limited in this application. The method includes: The terminal device receives first scheduled bandwidth threshold information from a network device, where a first scheduled bandwidth threshold indicated by the first scheduled bandwidth threshold information meets a first condition, and the first condition includes at least one of the following: modulation symbols of different PTRSs in a PTRS pattern determined based on the first scheduled bandwidth threshold correspond to different mapping locations, modulation symbols of PTRSs in different PTRS groups in the PTRS pattern determined based on the first scheduled bandwidth threshold correspond to discontinuous mapping locations, and a ratio of a total quantity of modulation symbols in the PTRS pattern determined based on the first scheduled bandwidth threshold to a quantity of subcarriers in scheduled bandwidth is less than or equal to a first threshold. The total quantity of modulation symbols of the PTRS is a product of a quantity of PTRS groups and a quantity of modulation symbols in the PTRS group, and the scheduled bandwidth is minimum scheduled bandwidth corresponding to the determined PTRS pattern. The terminal device determines a PTRS pattern on one orthogonal frequency division multiplexing (OFDM) symbol in an OFDM signal based on the scheduled bandwidth threshold, where the PTRS pattern includes at least one PTRS group, and each PTRS group includes at least one modulation symbol.

Based on the foregoing solution, a PTRS pattern corresponding to each of scheduled bandwidth ranges defined based on the first scheduled bandwidth threshold meets the first condition on minimum scheduled bandwidth belonging to the scheduled bandwidth range, so that the terminal device does not have a fuzzy behavior when determining the PTRS pattern, demodulation performance can be ensured, and spectral efficiency can be improved.

Optionally, before determining the PTRS pattern on the OFDM symbol, the terminal device receives scheduled bandwidth information from the network device, where the scheduled bandwidth information indicates the scheduled bandwidth. The terminal device determines the PTRS pattern on the OFDM symbol in the OFDM signal based on the scheduled bandwidth threshold and the scheduled bandwidth.

It should be understood that, in addition to the parameters: namely, the scheduled bandwidth threshold and the scheduled bandwidth, the terminal device may alternatively determine the PTRS pattern based on another parameter, for example, a modulation and coding scheme MCS threshold or an MCS. This is not specifically limited herein in this application.

With reference to the first aspect, in an implementation of the first aspect, before receiving the first scheduled bandwidth threshold information from the network device, the terminal device determines a second scheduled bandwidth threshold based on a capability of the terminal device, and sends second scheduled bandwidth threshold information to the network device, where the second scheduled bandwidth threshold information indicates the second scheduled bandwidth threshold.

Based on the foregoing solution, the terminal device actively reports the second scheduled bandwidth threshold based on the capability of the terminal device, so that the network device may refer to the second scheduled bandwidth threshold when configuring the first scheduled bandwidth threshold. For example, the terminal device reports a group of small scheduled bandwidth thresholds when chip quality is poor or a phase noise level is poor, so that a total quantity of PTRS modulation symbols corresponding to the scheduled bandwidth $N_{RB}$ is large, and is greater than or equal to a total quantity of PTRS modulation symbols corresponding to, in the same scheduled bandwidth, a scheduled bandwidth threshold reported by a terminal device with high chip quality or a good phase noise level. In this way, the scheduled bandwidth threshold configured by the network device better matches performance of the current terminal device.

According to a second aspect, a method for determining a phase tracking reference signal (PTRS) pattern is provided. The method may be performed by a terminal device, or may be performed by a chip or a circuit disposed in the terminal device. This is not limited in this application. The method includes: The terminal device determines a first PTRS pattern on one orthogonal frequency division multiplexing OFDM symbol in an OFDM signal based on a third scheduled bandwidth threshold, where the first PTRS pattern meets a second condition, and the second condition includes at least one of the following: modulation symbols of different PTRSs in the first PTRS pattern correspond to different mapping locations, modulation symbols of PTRSs in different PTRS groups in the first PTRS pattern correspond to discontinuous mapping locations, and a ratio of a total quantity of modulation symbols in the first PTRS pattern to a quantity of subcarriers in scheduled bandwidth is less than or equal to a first threshold. The first PTRS pattern includes at least one PTRS group, and each PTRS group includes at least one modulation symbol. The total quantity of modulation symbols of the PTRS is a product of a quantity of PTRS groups and a quantity of modulation symbols in the PTRS group, and the scheduled bandwidth is bandwidth allocated by a network device to the terminal device.

Based on the foregoing solution, the third scheduled bandwidth threshold may be determined based on an existing protocol. When determining the PTRS pattern, the terminal device needs to ensure that the PTRS pattern on the OFDM symbol in the OFDM signal meets the second condition, so that the terminal device does not have a fuzzy behavior when determining the PTRS pattern, demodulation performance can be ensured, and spectral efficiency can be improved.

Optionally, the terminal device determines the first PTRS pattern on the orthogonal frequency division multiplexing OFDM symbol in the OFDM signal based on the scheduled bandwidth threshold and the scheduled bandwidth.

It should be understood that, in addition to the parameters: namely, the scheduled bandwidth threshold and the scheduled bandwidth, the terminal device may alternatively determine the PTRS pattern based on another parameter, for example, a modulation and coding scheme MCS threshold or an MCS. This is not specifically limited herein in this application.

With reference to the second aspect, in an implementation of the second aspect, the terminal device determines a second PTRS pattern based on the third scheduled bandwidth threshold and the scheduled bandwidth, and if the second PTRS pattern does not meet the second condition, determines the first PTRS pattern on the OFDM symbol in the OFDM signal based on the second PTRS pattern, where the first PTRS pattern is obtained by reducing a quantity of PTRS groups in the second PTRS pattern and/or reducing a quantity of modulation symbols in the PTRS group in the second PTRS pattern. Optionally, the first PTRS pattern may be one PTRS pattern in a PTRS pattern set.

Optionally, when determining that the second PTRS pattern does not meet the second condition, the terminal device sequentially selects patterns in the PTRS pattern set in descending order until the first PTRS pattern that meets the second condition is obtained, or determines, based on the scheduled bandwidth, a total quantity of modulation symbols of the PTRS that meets the second condition, and then selects the first PTRS pattern corresponding to a maximum quantity of PTRS modulation symbols that is less than or equal to the total quantity of modulation symbols.

It should be understood that the PTRS pattern set is a set including a PTRS pattern corresponding to each of scheduled bandwidth ranges determined by the terminal device based on a scheduled bandwidth threshold in the existing protocol, that is, the third scheduled bandwidth threshold.

According to a third aspect, a method for determining a resource element is provided. The method may be performed by a terminal device, or may be performed by a chip or a circuit disposed in the terminal device. This is not limited in this application. The method includes: The terminal device determines a first overhead of a PTRS, where the first overhead of the PTRS is determined based on a total quantity of modulation symbols of the PTRS, a quantity of resource blocks scheduled for the terminal device, and a symbol-level time domain density of the PTRS, and the total quantity of modulation symbols of the PTRS is a product of a quantity of PTRS groups and a quantity of modulation symbols in the PTRS group, and when the first overhead of the PTRS is greater than a second threshold, determines a second overhead of the PTRS based on the first overhead of the PTRS. The terminal device determines, based on an overhead of a demodulation reference signal (DMRS), a comprehensive overhead of a higher layer signaling configuration, and the second overhead of the PTRS, a quantity of first resource elements to which data is mapped.

Based on the foregoing solution, when the first overhead that is of the PTRS and that is determined by the terminal device is greater than the second threshold, the overhead of the PTRS needs to be considered when the quantity of first resource elements to which the data is mapped is calculated. This can avoid a problem of low spectral efficiency caused by a high actual bit rate and a high decoding error rate that are caused when the data is mapped to the configured first resource element.

It should be understood that the first resource element is a valid resource element to which data can be mapped, and the terminal device may further determine the quantity of first resource elements based on the overhead of the demodulation reference signal DMRS, the comprehensive overhead of the higher layer signaling configuration, the second overhead of the PTRS, and another parameter (for example, a reserved resource configuration or an unavailable resource configuration). A quantity of specific parameters used by the terminal device to determine the first resource element is not limited in this solution.

With reference to the third aspect, in an implementation of the third aspect, the quantity of first resource elements may be determined according to the following relational expression:

$$N_{RE} = N_{sc}^{RB} \times N_{symb}^{sh} - N_{DMRS}^{PRB} - N_{oh}^{PRB} - N_{PTRS}^{PRB}$$

$N_{RE}$ is the quantity of first resource elements, $$N_{sc}^{RB}$$

is a quantity of subcarriers included in one resource block RB, $$N_{DMRS}^{PRB}$$

is the overhead of the DMRS, $$N_{oh}^{PRB}$$

is the comprehensive overhead of the higher layer signaling configuration, and $$N_{PTRS}^{PRB}$$

is the second overhead of the PTRS.

Optionally, the second overhead of the PTRS is the first overhead of the PTRS or a quantization overhead of the PTRS, and the quantization overhead of the PTRS is determined based on the first overhead of the PTRS and a quantization interval.

According to a fourth aspect, a method for determining a phase tracking reference signal (PTRS) pattern is provided. The method may be performed by a network device, or may be performed by a chip or a circuit disposed in the network device. This is not limited in this application. The method includes: The network device sends first scheduled bandwidth threshold information to a terminal device, where a first scheduled bandwidth threshold indicated by the first scheduled bandwidth threshold information meets a first condition, and the first condition includes at least one of the following: modulation symbols of different PTRSs in a PTRS pattern determined based on the first scheduled bandwidth threshold correspond to different mapping locations, modulation symbols of PTRSs in different PTRS groups in the PTRS pattern determined based on the first scheduled bandwidth threshold correspond to discontinuous mapping locations, and a ratio of a total quantity of modulation symbols in the PTRS pattern determined based on the scheduled bandwidth threshold to a quantity of subcarriers in scheduled bandwidth is less than or equal to a first threshold. The total quantity of modulation symbols of the PTRS is a product of a quantity of PTRS groups and a quantity of modulation symbols in the PTRS group, and the scheduled bandwidth is minimum scheduled bandwidth corresponding to the determined PTRS pattern. The network device determines a PTRS pattern on one OFDM symbol in an OFDM signal based on the scheduled bandwidth threshold, where the PTRS pattern includes at least one PTRS group, and each PTRS group includes at least one modulation symbol.

Based on the foregoing solution, a PTRS pattern corresponding to each of scheduled bandwidth ranges defined based on the first scheduled bandwidth threshold meets the first condition on minimum scheduled bandwidth belonging to the scheduled bandwidth range, so that the network device does not have a fuzzy behavior when determining the PTRS pattern, demodulation performance can be ensured, and spectral efficiency can be improved.

Optionally, the network device sends scheduled bandwidth information to the terminal device, where the scheduled bandwidth information indicates the scheduled bandwidth. The network device determines the PTRS pattern on the OFDM symbol in the OFDM signal based on the scheduled bandwidth threshold and the scheduled bandwidth.

It should be understood that, in addition to the parameters: namely, the scheduled bandwidth threshold and the scheduled bandwidth, the network device may alternatively determine the PTRS pattern based on another parameter, for example, a modulation and coding scheme MCS threshold or an MCS. This is not specifically limited herein in this application.

With reference to the fourth aspect, in an implementation of the fourth aspect, before the network device sends the first scheduled bandwidth threshold information to the terminal device, the network device receives second scheduled bandwidth threshold information from the terminal device, where the second scheduled bandwidth threshold information indicates a second scheduled bandwidth threshold, and the second scheduled bandwidth threshold is determined based on a capability of the terminal device. The network device determines the first scheduled bandwidth threshold based on the second scheduled bandwidth threshold.

Based on the foregoing solution, when configuring the first scheduled bandwidth threshold, the network device may refer to the second scheduled bandwidth threshold reported by the terminal device based on the capability of the terminal device. For example, the terminal device reports a group of small scheduled bandwidth thresholds when chip quality is poor or a phase noise level is poor, so that a total quantity of PTRS modulation symbols corresponding to the scheduled bandwidth $N_{RB}$ is large, and is greater than or equal to a total quantity of PTRS modulation symbols corresponding to, in the same scheduled bandwidth, a scheduled bandwidth threshold reported by a terminal device with high chip quality or a good phase noise level. In this way, the scheduled bandwidth threshold configured by the network device better matches performance of the current terminal device.

According to a fifth aspect, a method for determining a phase tracking reference signal (PTRS) pattern is provided. The method may be performed by a network device, or may be performed by a chip or a circuit disposed in the network device. This is not limited in this application. The method includes: The network device determines a first PTRS pattern on one OFDM symbol in an OFDM signal based on a third scheduled bandwidth threshold, where the first PTRS pattern meets a second condition, and the second condition includes at least one of the following: modulation symbols of different PTRSs in the first PTRS pattern correspond to different mapping locations, modulation symbols of PTRSs in different PTRS groups in the first PTRS pattern correspond to discontinuous mapping locations, and a ratio of a total quantity of modulation symbols in the first PTRS pattern to a quantity of subcarriers in scheduled bandwidth is less than or equal to a first threshold. The total quantity of modulation symbols of the PTRS is a product of a quantity of PTRS groups and a quantity of modulation symbols in the PTRS group, and the scheduled bandwidth is bandwidth allocated by the network device to a terminal device.

Based on the foregoing solution, the third scheduled bandwidth threshold may be determined based on an existing protocol. When determining the PTRS pattern, the network device needs to ensure that the PTRS pattern on the OFDM symbol in the OFDM signal meets the second condition, so that the network device does not have a fuzzy behavior when determining the PTRS pattern, demodulation performance can be ensured, and spectral efficiency can be improved.

Optionally, the network device determines the first PTRS pattern on the orthogonal frequency division multiplexing OFDM symbol in the OFDM signal based on the scheduled bandwidth threshold and the scheduled bandwidth.

It should be understood that, in addition to the parameters: namely, the scheduled bandwidth threshold and the scheduled bandwidth, the network device may alternatively determine the PTRS pattern based on another parameter, for example, a modulation and coding scheme MCS threshold or an MCS. This is not specifically limited herein in this application.

With reference to the fifth aspect, in an implementation of the fifth aspect, the network device determines a second PTRS pattern based on the third scheduled bandwidth threshold and the scheduled bandwidth, and the second PTRS pattern does not meet the second condition. The network device determines the first PTRS pattern on the OFDM symbol in the OFDM signal based on the second PTRS pattern, where the first PTRS pattern is obtained by reducing a quantity of PTRS groups in the second PTRS pattern and/or reducing a quantity of modulation symbols in the PTRS group in the second PTRS pattern. Optionally, the first PTRS pattern may be one PTRS pattern in a PTRS pattern set.

Optionally, when determining that the second PTRS pattern does not meet the second condition, the network device sequentially selects patterns in the PTRS pattern set in descending order until the first PTRS pattern that meets the second condition is obtained, or determines, based on the scheduled bandwidth, a total quantity of modulation symbols of the PTRS that meets the second condition, and then selects the first PTRS pattern corresponding to a maximum quantity of PTRS modulation symbols that is less than or equal to the total quantity of modulation symbols.

It should be understood that the PTRS pattern set is a set including a PTRS pattern corresponding to each of scheduled bandwidth ranges determined by the network device based on a scheduled bandwidth threshold in the existing protocol, that is, the third scheduled bandwidth threshold.

According to a sixth aspect, a method for determining a resource element is provided. The method may be performed by a network device, or may be performed by a chip or a circuit disposed in the network device. This is not limited in this application. The method includes: The network device determines a first overhead of a PTRS, where the first overhead of the PTRS is determined based on a total quantity of modulation symbols of the PTRS, a quantity of resource blocks scheduled for a terminal device, and a symbol-level time domain density of the PTRS, and the total quantity of modulation symbols of the PTRS is a product of a quantity of PTRS groups and a quantity of modulation symbols in the PTRS group, and when the first overhead of the PTRS is greater than a second threshold, determines a second overhead of the PTRS based on the first overhead of the PTRS. The network device determines, based on an overhead of a demodulation reference signal (DMRS), a comprehensive overhead of a higher layer signaling configuration, and the second overhead of the PTRS, a quantity of first resource elements to which an orthogonal frequency division multiplexing OFDM signal is mapped.

Based on the foregoing solution, when the first overhead that is of the PTRS and that is determined by the network device is greater than the second threshold, the overhead of the PTRS needs to be considered when the quantity of first resource elements to which data is mapped is calculated. This can avoid a problem of low spectral efficiency caused by a high actual bit rate and a high decoding error rate that are caused when the data is mapped to the configured first resource element.

It should be understood that the first resource element is a valid resource element to which data can be mapped, and the network device may further determine the quantity of first resource elements based on the overhead of the demodulation reference signal DMRS, the comprehensive overhead of the higher layer signaling configuration, the second overhead of the PTRS, and another parameter (for example, a reserved resource configuration or an unavailable resource configuration). A quantity of specific parameters used by the network device to determine the first resource element is not limited in this solution.

With reference to the sixth aspect, in an implementation of the sixth aspect, the quantity of first resource elements may be determined according to the following relational expression:

$$N_{RE} = N_{sc}^{RB} \times N_{symb}^{sh} - N_{DMRS}^{PRB} - N_{oh}^{PRB} - N_{PTRS}^{PRB}$$

$N_{RE}$ is the quantity of first resource elements, $$N_{sc}^{RB}$$

is a quantity of subcarriers included in one resource block RB, $$N_{DMRS}^{PRB}$$

is the overhead of the DMRS, $$N_{oh}^{PRB}$$

is the comprehensive overhead of the higher layer signaling configuration, and $$N_{PTRS}^{PRB}$$

is the second overhead of the PTRS.

Optionally, the second overhead of the PTRS is the first overhead of the PTRS or a quantization overhead of the PTRS, and the quantization overhead of the PTRS is determined based on the first overhead of the PTRS and a quantization interval.

According to a seventh aspect, an apparatus for determining a PTRS pattern is provided. The apparatus may be a terminal device, or may be a chip or a circuit disposed in the terminal device. This is not limited in this application. The apparatus includes a transceiver unit and a processing unit. The transceiver unit is configured to receive first scheduled bandwidth threshold information from a network device, where a first scheduled bandwidth threshold indicated by the first scheduled bandwidth threshold information meets a first condition, and the first condition includes at least one of the following: modulation symbols of different PTRSs in a PTRS pattern determined based on the first scheduled bandwidth threshold correspond to different mapping locations, modulation symbols of PTRSs in different PTRS groups in the PTRS pattern determined based on the first scheduled bandwidth threshold correspond to discontinuous mapping locations, and a ratio of a total quantity of modulation symbols in the PTRS pattern determined based on the first scheduled bandwidth threshold to a quantity of subcarriers in scheduled bandwidth is less than or equal to a first threshold. The total quantity of modulation symbols of the PTRS is a product of a quantity of PTRS groups and a quantity of modulation symbols in the PTRS group, and the scheduled bandwidth is minimum scheduled bandwidth corresponding to the determined PTRS pattern. The processing unit is configured to determine a PTRS pattern on one orthogonal frequency division multiplexing OFDM symbol in an OFDM signal based on the scheduled bandwidth threshold, where the PTRS pattern includes at least one PTRS group, and each PTRS group includes at least one modulation symbol.

Based on the foregoing solution, a PTRS pattern corresponding to each of scheduled bandwidth ranges defined based on the first scheduled bandwidth threshold meets the first condition on minimum scheduled bandwidth belonging to the scheduled bandwidth range, so that the terminal device does not have a fuzzy behavior when determining the PTRS pattern, demodulation performance can be ensured, and spectral efficiency can be improved.

Optionally, before the terminal device determines the PTRS pattern on the OFDM symbol, the transceiver unit is further configured to receive scheduled bandwidth information from the network device, where the scheduled bandwidth information indicates the scheduled bandwidth. The processing unit is further configured to determine the PTRS pattern on the OFDM symbol in the OFDM signal based on the scheduled bandwidth threshold and the scheduled bandwidth.

It should be understood that, in addition to the parameters: namely, the scheduled bandwidth threshold and the scheduled bandwidth, the processing unit may alternatively determine the PTRS pattern based on another parameter, for example, a modulation and coding scheme MCS threshold or an MCS. This is not specifically limited herein in this application.

With reference to the seventh aspect, in an implementation of the seventh aspect, the processing unit is further used by the terminal device to determine a second scheduled bandwidth threshold based on a capability of the terminal device. The transceiver unit is further configured to send second scheduled bandwidth threshold information to the network device, where the second scheduled bandwidth threshold information indicates the second scheduled bandwidth threshold.

According to an eighth aspect, an apparatus for determining a PTRS pattern is provided. The apparatus may be a terminal device, or may be a chip or a circuit disposed in the terminal device. This is not limited in this application. The apparatus includes a processing unit and a transceiver unit. The processing unit is configured to determine a first PTRS pattern on one orthogonal frequency division multiplexing OFDM symbol in an OFDM signal based on a third scheduled bandwidth threshold, where the first PTRS pattern meets a second condition, and the second condition includes at least one of the following: modulation symbols of different PTRSs in the first PTRS pattern correspond to different mapping locations, modulation symbols of PTRSs in different PTRS groups in the first PTRS pattern correspond to discontinuous mapping locations, and a ratio of a total quantity of modulation symbols in the first PTRS pattern to a quantity of subcarriers in scheduled bandwidth is less than or equal to a first threshold. The first PTRS pattern includes at least one PTRS group, and each PTRS group includes at least one modulation symbol. The total quantity of modulation symbols of the PTRS is a product of a quantity of PTRS groups and a quantity of modulation symbols in the PTRS group, and the scheduled bandwidth is bandwidth allocated by a network device to the terminal device.

Based on the foregoing solution, the third scheduled bandwidth threshold may be determined based on an existing protocol. When determining the PTRS pattern, the terminal device needs to ensure that the PTRS pattern on the OFDM symbol in the OFDM signal meets the second condition, so that the terminal device does not have a fuzzy behavior when determining the PTRS pattern, demodulation performance can be ensured, and spectral efficiency can be improved.

Optionally, the processing unit is further configured to determine the first PTRS pattern on the orthogonal frequency division multiplexing OFDM symbol in the OFDM signal based on the scheduled bandwidth threshold and the scheduled bandwidth.

It should be understood that, in addition to the parameters: namely, the scheduled bandwidth threshold and the scheduled bandwidth, the processing unit may alternatively determine the PTRS pattern based on another parameter, for example, a modulation and coding scheme MCS threshold or an MCS. This is not specifically limited herein in this application.

With reference to the eighth aspect, in an implementation of the eighth aspect, the processing unit is further configured to: determine a second PTRS pattern based on the third scheduled bandwidth threshold and the scheduled bandwidth, and if the second PTRS pattern does not meet the second condition, determine the first PTRS pattern on the OFDM symbol in the OFDM signal based on the second PTRS pattern, where the first PTRS pattern is obtained by reducing a quantity of PTRS groups in the second PTRS pattern and/or reducing a quantity of modulation symbols in the PTRS group in the second PTRS pattern. Optionally, the first PTRS pattern may be one PTRS pattern in a PTRS pattern set.

Optionally, when determining that the second PTRS pattern does not meet the second condition, the processing unit sequentially selects patterns in the PTRS pattern set in descending order until the first PTRS pattern that meets the second condition is obtained, or determines, based on the scheduled bandwidth, a total quantity of modulation symbols of the PTRS that meets the second condition, and then selects the first PTRS pattern corresponding to a maximum quantity of PTRS modulation symbols that is less than or equal to the total quantity of modulation symbols.

It should be understood that the PTRS pattern set is a set including a PTRS pattern corresponding to each of scheduled bandwidth ranges determined by the terminal device based on a scheduled bandwidth threshold in the existing protocol, that is, the third scheduled bandwidth threshold.

According to a ninth aspect, an apparatus for determining a resource element is provided. The apparatus may be a terminal device, or may be a chip or a circuit disposed in the terminal device. This is not limited in this application. The apparatus includes a processing unit. The processing unit is configured to determine a first overhead of a PTRS, where the first overhead of the PTRS is determined based on a total quantity of modulation symbols of the PTRS, a quantity of resource blocks scheduled for the terminal device, and a symbol-level time domain density of the PTRS, and the total quantity of modulation symbols of the PTRS is a product of a quantity of PTRS groups and a quantity of modulation symbols in the PTRS group. When the first overhead of the PTRS is greater than a second threshold, the processing unit is further configured to determine a second overhead of the PTRS based on the first overhead of the PTRS. The processing unit is further configured to determine, based on an overhead of a demodulation reference signal (demodulation reference signal, DMRS), a comprehensive overhead of a higher layer signaling configuration, and the second overhead of the PTRS, a quantity of first resource elements to which data is mapped.

Based on the foregoing solution, when the first overhead that is of the PTRS and that is determined by the terminal device is greater than the second threshold, the overhead of the PTRS needs to be considered when the quantity of first resource elements to which the data is mapped is calculated. This can avoid a problem of low spectral efficiency caused by a high actual bit rate and a high decoding error rate that are caused when data is mapped to a configured valid resource element.

It should be understood that the first resource element is a valid resource element to which data can be mapped, and the processing unit may further determine the quantity of first resource elements based on the overhead of the demodulation reference signal DMRS, the comprehensive overhead of the higher layer signaling configuration, the second overhead of the PTRS, and another parameter. A quantity of specific parameters used by the processing unit to determine the first resource element is not limited in this solution.

With reference to the ninth aspect, in an implementation of the ninth aspect, the quantity of first resource elements may be determined according to the following relational expression:

$$N_{RE} = N_{sc}^{RB} \times N_{symb}^{sh} - N_{DMRS}^{PRB} - N_{oh}^{PRB} - N_{PTRS}^{PRB}$$

$N_{RE}$ is the quantity of first resource elements, $$N_{sc}^{RB}$$

is a quantity of subcarriers included in one resource block RB, $$N_{DMRS}^{PRB}$$

is the overhead of the DMRS, $$N_{oh}^{PRB}$$

is the comprehensive overhead of the higher layer signaling configuration, and $$N_{PTRS}^{PRB}$$

is the second overhead of the PTRS.

Optionally, the second overhead of the PTRS is the first overhead of the PTRS or a quantization overhead of the PTRS, and the quantization overhead of the PTRS is determined based on the first overhead of the PTRS and a quantization interval.

According to a tenth aspect, an apparatus for determining a PTRS pattern is provided. The apparatus may be a network device, or may be a chip or a circuit disposed in the network device. This is not limited in this application. The apparatus includes a transceiver unit and a processing unit. The transceiver unit is configured to send first scheduled bandwidth threshold information to a terminal device, where a first scheduled bandwidth threshold indicated by the first scheduled bandwidth threshold information meets a first condition, and the first condition includes at least one of the following: modulation symbols of different PTRSs in a PTRS pattern determined based on the first scheduled bandwidth threshold correspond to different mapping locations, modulation symbols of PTRSs in different PTRS groups in the PTRS pattern determined based on the first scheduled bandwidth threshold correspond to discontinuous mapping locations, and a ratio of a total quantity of modulation symbols in the PTRS pattern determined based on the scheduled bandwidth threshold to a quantity of subcarriers in scheduled bandwidth is less than or equal to a first threshold. The total quantity of modulation symbols of the PTRS is a product of a quantity of PTRS groups and a quantity of modulation symbols in the PTRS group. The processing unit is configured to determine a PTRS pattern on one OFDM symbol in an OFDM signal based on the scheduled bandwidth threshold, where the PTRS pattern includes at least one PTRS group, and each PTRS group includes at least one modulation symbol.

Based on the foregoing solution, a PTRS pattern corresponding to each of scheduled bandwidth ranges defined based on the first scheduled bandwidth threshold meets the first condition on minimum scheduled bandwidth belonging to the scheduled bandwidth range, so that the network device does not have a fuzzy behavior when determining the PTRS pattern, demodulation performance can be ensured, and spectral efficiency can be improved.

Optionally, the transceiver unit is further configured to send scheduled bandwidth information to the terminal device, where the scheduled bandwidth information indicates the scheduled bandwidth. The processing unit is further configured to determine the PTRS pattern on the OFDM symbol in the OFDM signal based on the scheduled bandwidth threshold and the scheduled bandwidth.

It should be understood that, in addition to the parameters: namely, the scheduled bandwidth threshold and the scheduled bandwidth, the processing unit may alternatively determine the PTRS pattern based on another parameter, for example, a modulation and coding scheme MCS threshold or an MCS. This is not specifically limited herein in this application.

With reference to the tenth aspect, in an implementation of the tenth aspect, before the transceiver unit sends the first scheduled bandwidth threshold information to the terminal device, the transceiver unit is further configured to receive second scheduled bandwidth threshold information from the terminal device, where the second scheduled bandwidth threshold information indicates a second scheduled bandwidth threshold, and the second scheduled bandwidth threshold is determined based on a capability of the terminal device. The processing unit is further configured to determine the first scheduled bandwidth threshold based on the second scheduled bandwidth threshold.

Based on the foregoing solution, when configuring the first scheduled bandwidth threshold, the network device may refer to the second scheduled bandwidth threshold reported by the terminal device based on the capability of the terminal device. For example, the terminal device reports a group of small scheduled bandwidth thresholds when chip quality is poor or a phase noise level is poor, so that a total quantity of PTRS modulation symbols corresponding to the scheduled bandwidth is large, and is greater than or equal to a total quantity of PTRS modulation symbols corresponding to, in the same scheduled bandwidth, a scheduled bandwidth threshold reported by a terminal device with high chip quality or a good phase noise level. In this way, the scheduled bandwidth threshold configured by the network device better matches performance of the current terminal device.

According to an eleventh aspect, an apparatus for determining a PTRS pattern is provided. The apparatus may be a network device, or may be a chip or a circuit disposed in the network device. This is not limited in this application. The apparatus includes a transceiver unit and a processing unit. The processing unit is configured to determine a first PTRS pattern on one OFDM symbol in an OFDM signal based on a third scheduled bandwidth threshold, where the first PTRS pattern meets a second condition, and the second condition includes at least one of the following: modulation symbols of different PTRSs in the first PTRS pattern correspond to different mapping locations, modulation symbols of PTRSs in different PTRS groups in the first PTRS pattern correspond to discontinuous mapping locations, and a ratio of a total quantity of modulation symbols in the first PTRS pattern to a quantity of subcarriers in scheduled bandwidth is less than or equal to a first threshold. The total quantity of modulation symbols of the PTRS is a product of a quantity of PTRS groups and a quantity of modulation symbols in the PTRS group, and the scheduled bandwidth is bandwidth allocated by the network device to a terminal device.

Based on the foregoing solution, the third scheduled bandwidth threshold may be determined based on an existing protocol. When determining a PTRS pattern, the network device needs to ensure that the PTRS pattern on the OFDM symbol in the OFDM signal meets the second condition, so that the network device does not have a fuzzy behavior when determining the PTRS pattern, demodulation performance can be ensured, and spectral efficiency can be improved.

Optionally, the processing unit is further configured to determine the first PTRS pattern on the orthogonal frequency division multiplexing OFDM symbol in the OFDM signal based on the scheduled bandwidth threshold and the scheduled bandwidth.

It should be understood that, in addition to the parameters: namely, the scheduled bandwidth threshold and the scheduled bandwidth, the processing unit may alternatively determine the PTRS pattern based on another parameter, for example, a modulation and coding scheme MCS threshold or an MCS. This is not specifically limited herein in this application.

With reference to the eleventh aspect, in an implementation of the eleventh aspect, the processing unit is further configured to determine a second PTRS pattern based on the third scheduled bandwidth threshold and the scheduled bandwidth. When the second PTRS pattern does not meet the second condition, the processing unit is further configured to determine the first PTRS pattern on the OFDM symbol in the OFDM signal based on the second PTRS pattern, where the first PTRS pattern is obtained by reducing a quantity of PTRS groups in the second PTRS pattern and/or reducing a quantity of modulation symbols in the PTRS group in the second PTRS pattern. Optionally, the first PTRS pattern may be one PTRS pattern in a PTRS pattern set.

Optionally, when determining that the second PTRS pattern does not meet the second condition, the processing unit sequentially selects patterns in the PTRS pattern set in descending order until the first PTRS pattern that meets the second condition is obtained. Alternatively, the processing unit determines, based on the scheduled bandwidth, a total quantity of modulation symbols of the PTRS that meets the second condition, and then selects the first PTRS pattern corresponding to a maximum quantity of PTRS modulation symbols that is less than or equal to the total quantity of modulation symbols.

It should be understood that the PTRS pattern set is a set including a PTRS pattern corresponding to each of scheduled bandwidth ranges determined by the network device based on a scheduled bandwidth threshold in the existing protocol, that is, the third scheduled bandwidth threshold.

According to a twelfth aspect, an apparatus for determining a resource element is provided. The apparatus may be a network device, or may be a chip or a circuit disposed in the network device. This is not limited in this application. The apparatus includes a processing unit. The processing unit is configured to determine a first overhead of a PTRS, where the first overhead of the PTRS is determined based on a total quantity of modulation symbols of the PTRS, a quantity of resource blocks scheduled for a terminal device, and a symbol-level time domain density of the PTRS, and the total quantity of modulation symbols of the PTRS is a product of a quantity of PTRS groups and a quantity of modulation symbols in the PTRS group. When the first overhead of the PTRS is greater than a second threshold, the processing unit determines a second overhead of the PTRS based on the first overhead of the PTRS. The processing unit is further configured to determine, based on an overhead of a demodulation reference signal (DMRS), a comprehensive overhead of a higher layer signaling configuration, and the second overhead of the PTRS, a quantity of first resource elements to which an orthogonal frequency division multiplexing OFDM signal is mapped.

Based on the foregoing solution, when the first overhead that is of the PTRS and that is determined by the network device is greater than the second threshold, the overhead of the PTRS needs to be considered when a quantity of valid resource elements to which data is mapped is calculated. This can avoid a problem of low spectral efficiency caused by a high actual bit rate and a high decoding error rate that are caused when the data is mapped to the configured valid resource element.

It should be understood that the first resource element is a valid resource element to which data can be mapped, and the network device may further determine the quantity of first resource elements based on the overhead of the demodulation reference signal DMRS, the comprehensive overhead of the higher layer signaling configuration, the second overhead of the PTRS, and another parameter (for example, a reserved resource configuration or an unavailable resource configuration). A quantity of specific parameters used by the network device to determine the first resource element is not limited in this solution.

With reference to the twelfth aspect, in an implementation of the twelfth aspect, the quantity of first resource elements may be determined according to the following relational expression:

$$N_{RE} = N_{Sc}^{RB} \times N_{symb}^{sh} - N_{DMRS}^{PRB} - N_{oh}^{PRB} - N_{PTRS}^{PRB}$$

$N_{RE}$ is the quantity of first resource elements, $$N_{sc}^{RB}$$

is a quantity of subcarriers included in one resource block RB, $$N_{DMRS}^{PRB}$$

is the overhead of the DMRS, $$N_{oh}^{PRB}$$

is the comprehensive overhead of the higher layer signaling configuration, and $$N_{PTRS}^{PRB}$$

is the second overhead of the PTRS.

Optionally, the second overhead of the PTRS is the first overhead of the PTRS or a quantization overhead of the PTRS, and the quantization overhead of the PTRS is determined based on the first overhead of the PTRS and a quantization interval.

According to a thirteenth aspect, a communication apparatus is provided. The apparatus may be the terminal device in any one of the first aspect to the third aspect, may be an electronic device disposed in the terminal device, or may be a large device including the terminal device. The apparatus is configured to perform the method provided in any one of the first aspect to the third aspect. The apparatus includes a transceiver and a processor.

Optionally, the apparatus further includes a memory. The processor is coupled to the memory, and may be configured to execute instructions in the memory, to implement the communication method in any one of the first aspect to the third aspect and the possible implementations of the first aspect to the third aspect. Optionally, the communication apparatus further includes the memory. Optionally, the apparatus further includes a communication interface, and the processor is coupled to the communication interface.

In an implementation, the communication interface may be a transceiver or an input/output interface.

In another implementation, the apparatus is a chip disposed in the terminal device. When the apparatus is a chip disposed in the terminal device, the communication interface may be an input/output interface, an interface circuit, an output circuit, an input circuit, a pin, a related circuit, or the like on the chip or a chip system. The processor may alternatively be embodied as a processing circuit or a logic circuit.

According to a fourteenth aspect, a communication apparatus is provided. The apparatus may be the network device in any one of the fourth aspect to the sixth aspect, or an electronic device disposed in the network device, or a larger device including the network device. The apparatus is configured to perform the communication method provided in the first aspect. The communication apparatus includes a transceiver and a processor.

Optionally, the processor is coupled to a memory, and may be configured to execute instructions in the memory, to implement the communication method in any one of the fourth aspect to the sixth aspect and the possible implementations of the fourth aspect to the sixth aspect. Optionally, the apparatus further includes the memory. Optionally, the apparatus further includes a communication interface, and the processor is coupled to the communication interface.

In an implementation, the communication interface may be a transceiver or an input/output interface.

In another implementation, the apparatus is a chip disposed in the network device. When the apparatus is a chip disposed in the network device, the communication interface may be an input/output interface, an interface circuit, an output circuit, an input circuit, a pin, a related circuit, or the like on the chip or a chip system. The processor may alternatively be embodied as a processing circuit or a logic circuit.

Optionally, the transceiver may be a transceiver circuit. Optionally, the input/output interface may be an input/output circuit.

In a specific implementation process, the processor may be one or more chips, the input circuit may be an input pin, the output circuit may be an output pin, and the processing circuit may be a transistor, a gate circuit, a trigger, various logic circuits, or the like. An input signal received by the input circuit may be received and input by, but not limited to, a receiver, a signal output by the output circuit may be output to, but not limited to, a transmitter and transmitted by the transmitter, and the input circuit and the output circuit may be a same circuit, where the circuit is used as the input circuit and the output circuit at different moments. Specific implementations of the processor and the circuits are not limited in this embodiment of this application.

According to a fifteenth aspect, a computer program product is provided. The computer program product includes a computer program (which may also be referred to as code or instructions). When the computer program is run, a computer is enabled to perform the method in any one of the first aspect to the sixth aspect and the possible implementations of the first aspect to the sixth aspect.

According to a sixteenth aspect, a computer-readable storage medium is provided. The computer-readable storage medium stores a computer program (which may also be referred to as code or instructions). When the computer program is run on a computer, the computer is enabled to perform the method in any one of the first aspect to the sixth aspect and the possible implementations of the first aspect to the sixth aspect.

According to a seventeenth aspect, a communication system is provided, and includes the foregoing network device and terminal device.

BRIEF DESCRIPTION OF DRAWINGS

FIG. 9 is a schematic diagram of determining a first resource element according to an embodiment of this application;

FIG. 10 is a schematic block diagram of a communication apparatus according to an embodiment of this application;

FIG. 11 is a schematic block diagram of another communication apparatus according to an embodiment of this application;

DESCRIPTION OF EMBODIMENTS

The following describes technical solutions in this application with reference to accompanying drawings.

Figure 1:
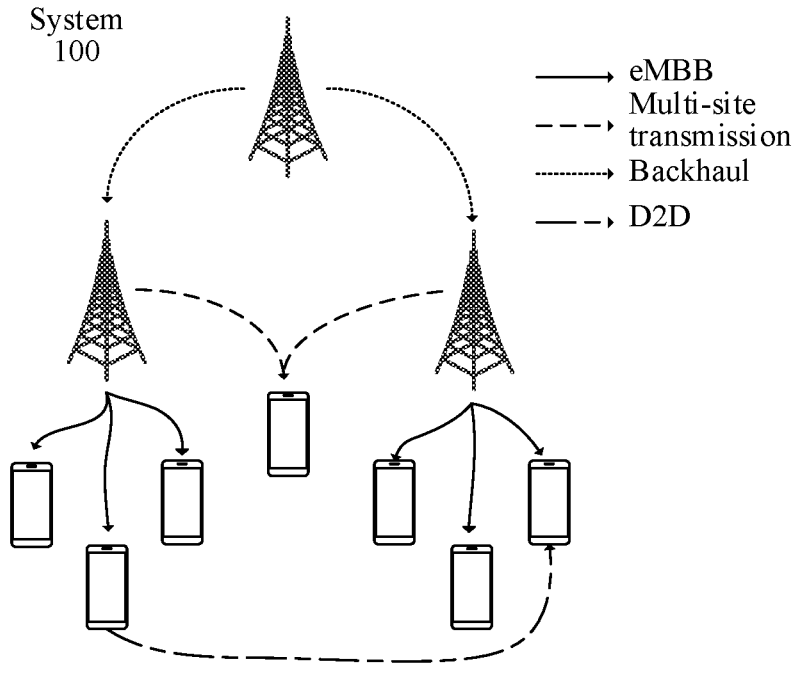
FIG. 1 is a schematic diagram of a communication system 100 applicable to an embodiment of this application.

FIG. 1 is a schematic diagram of a communication system 100 applicable to an embodiment of this application.

As shown in FIG. 1, the communication system 100 includes at least one network device and at least one terminal device. A connection may be established between a terminal device and a network device, or between a terminal device and a terminal device for communication. A sending device may indicate scheduling information of data by using control information, so that a receiving device correctly receives the data based on the control information.

Optionally, the communication system 100 includes a plurality of terminal devices. For example, in D2D communication, a scheduled node is a terminal device, and a scheduling node may also be a terminal device.

The terminal device in embodiments of this application may be user equipment, an access terminal, a subscriber unit, a subscriber station, a mobile station, a mobile console, a remote station, a remote terminal, a mobile device, a user terminal, a wireless communication device, a user agent, or a user apparatus. The terminal in embodiments of this application may be a mobile phone (mobile phone), a pad (pad), a computer with a wireless transceiver function, a virtual reality (VR) terminal, an augmented reality (AR) terminal, a wireless terminal in industrial control (industrial control), a wireless terminal in self-driving (self-driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), a cellular phone, a cordless phone, a session initiation protocol (SIP) phone, a wireless local loop (WLL) station, a personal digital assistant (PDA), a handheld device with a wireless communication function, a computing device, another processing device connected to a wireless modem, a vehicle-mounted device, a wearable device, a terminal in a 5G network, a terminal in a future evolved network, or the like.

The wearable device may also be referred to as a wearable intelligent device, and is a general term for wearable devices, such as glasses, gloves, watches, clothes, and shoes, that are developed by applying wearable technologies to intelligent designs of daily wear. The wearable device is a portable device that is directly worn on a body or integrated into clothes or an accessory of a user. The wearable device is not only a hardware device, but also implements a powerful function through software support, data exchange, and cloud interaction. In a broad sense, the wearable intelligent device includes a full-featured and large-sized device that can implement all or some functions without depending on a smartphone, for example, a smart watch or smart glasses, and includes a device that is dedicated to only one type of application function and needs to collaboratively work with other devices such as smartphones, for example, various smart bands, or smart jewelry for monitoring physical signs.

In addition, the terminal device may alternatively be a terminal device in an Internet of Things (IoT) system. IoT is an important part of future information technology development. A main technical feature of the IoT is to connect articles to a network by using a communication technology, to implement an intelligent network for human-machine interconnection and thing-thing interconnection. A specific form of the terminal device is not limited in this application.

It should be understood that, in embodiments of this application, the terminal device may be an apparatus configured to implement a function of the terminal device, or may be an apparatus that can support the terminal device in implementing the function, for example, a chip system. The apparatus may be installed in the terminal. In embodiments of this application, the chip system may include a chip, or may include a chip and another discrete device.

The network device in embodiments of this application may be any device with a wireless transceiver function. The device includes but is not limited to: an evolved NodeB (eNB), a radio network controller (RNC), a NodeB (NodeB, NB), a base station controller (BSC), a base transceiver station (BTS), a home base station (for example, a Home evolved NodeB, or a Home NodeB, HNB), a baseband unit (BBU), or an access point (AP), a wireless relay node, a wireless backhaul node, a transmission point (TP), a transmission reception point (TRP), or the like in a wireless fidelity (Wi-Fi) system. The device may alternatively be a gNB or a transmission point (TRP or TP) in a 5G system, for example, an NR system, or one or one group of (including a plurality of antenna panels) antenna panels of a base station in the 5G system, or may be a network node that constitutes a gNB or a transmission point, for example, a baseband unit (BBU) or a distributed unit (DU). Alternatively, the network device may be a radio controller in a cloud radio access network (CRAN) scenario, or may be a wearable device or a vehicle-mounted device.

In some deployment, the gNB may include a central unit (CU) and a DU. The gNB may further include an active antenna unit (AAU for short). The CU implements some functions of the gNB, and the DU implements some functions of the gNB. For example, the CU is responsible for processing a non-real-time protocol and service, and implementing functions of a radio resource control (RRC) layer and a packet data convergence protocol (PDCP) layer. The DU is responsible for processing a physical layer protocol and a real-time service, and implementing functions of a radio link control (RLC) layer, a media access control (MAC) layer, and a physical (PHY) layer. The AAU implements some physical layer processing functions, and functions related to radio frequency processing and an active antenna. Information at the RRC layer eventually becomes information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified as a network device in an access network (radio access network, RAN), or the CU may be classified as a network device in a core network (core network, CN). This is not limited in this application.

It should be understood that, in embodiments of this application, the network device may be an apparatus configured to implement a function of the network device, or may be an apparatus that can support the network device in implementing the function, for example, a chip system. The apparatus may be installed in the network device.

The technical solutions in embodiments of this application may be applied to various communication systems such as a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunications system (UMTS), a worldwide interoperability for microwave access (WiMAX) communication system, a 5th generation (5G) system or a future evolved communication system, vehicle-to-X (V2X), where the V2X may include vehicle to network (V2N), vehicle to vehicle (V2V), vehicle to infrastructure (V2I), vehicle to pedestrian (V2P), and the like, a long term evolution-vehicle (LTE-V), Internet of Vehicles, machine type communication (MTC), Internet of Things IoT), a long term evolution-machine (LTE-M), machine to machine (M2M), device to device (D2D), and the like.

This application may be applicable to the following scenarios: including but not limited to a scenario in which a timing requirement is high or a transmission rate requirement is high, such as multi-site transmission (a same UE simultaneously transmits a signal with a plurality of transmission points), backhaul, wireless to the x (WTTx), enhanced mobile broadband (eMBB), and device to device (device to device, D2D). This application does not limit a waveform, and may be applied to a CP-OFDM-based or DFT-s-OFDM-based system.

Figure 2:
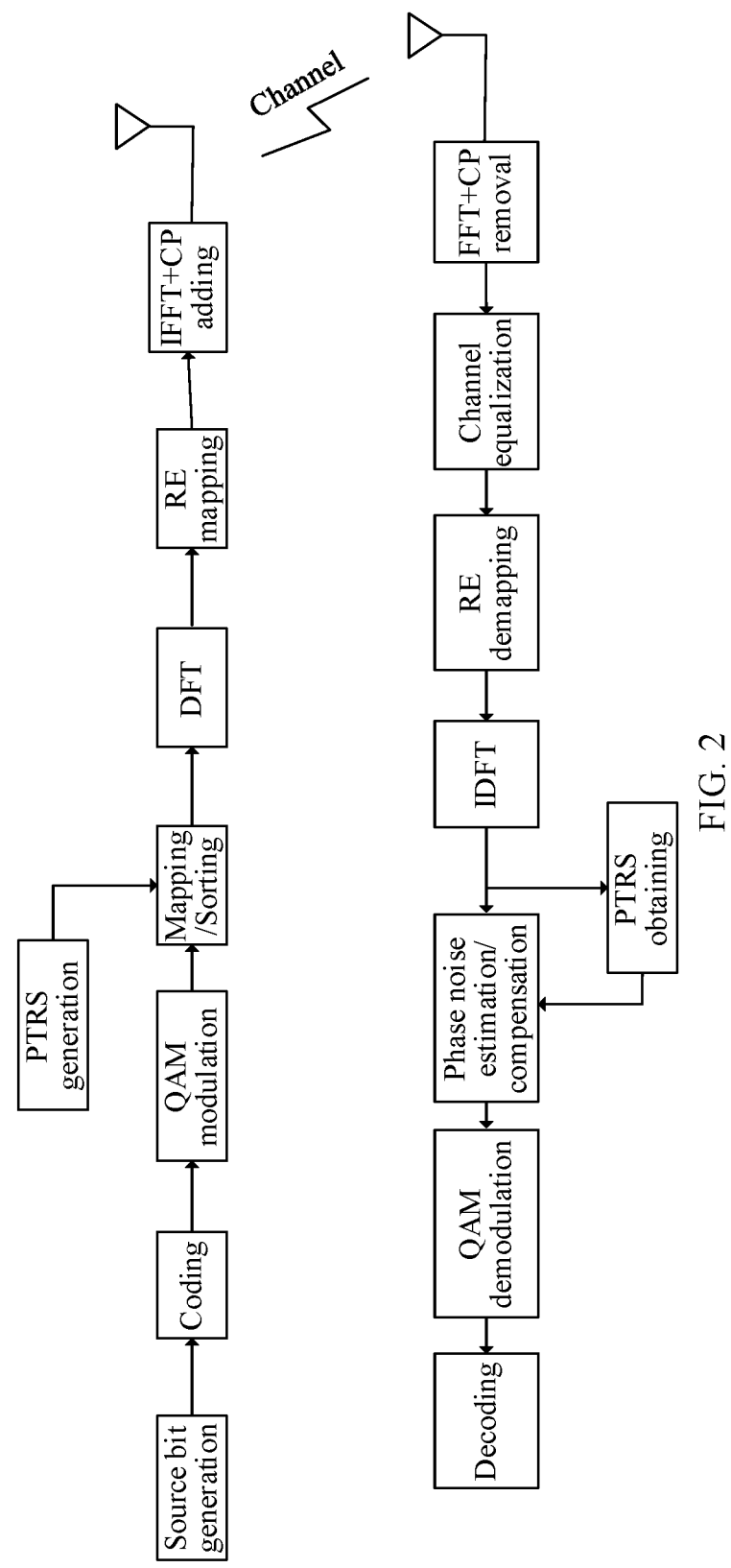
FIG. 2 is a schematic diagram of a functional module of a communication system applicable to an embodiment of this application.

FIG. 2 is a schematic diagram of a functional module of a communication system according to an embodiment of this application.

In a new radio (NR) protocol, in addition to a cyclic prefix orthogonal frequency division multiplexing (CP-OFDM) waveform, a discrete Fourier transformation spread orthogonal frequency division multiplexing (DFT-s-OFDM) waveform (inherited from LTE) is further supported in the uplink. Compared with the CP-OFDM, the waveform has a feature of a low peak-to-average power ratio (PAPR). After modulated data of the waveform is arranged, a DFT change needs to be performed before the data is mapped to a resource element, that is:

$$y(k) = \frac{1}{\sqrt{N}} \sum_{i=0}^{N-1} x(i) e^{-\frac{j2\pi ik}{N}} \qquad (1)$$

N is a quantity of subcarriers in scheduled bandwidth, and x(i) is a modulation symbol, a modulation method includes quadrature amplitude modulation (QAM) modulation, quadrature phase shift keying (quadrature phase shift keying, QPSK) modulation, $\pi/2$ shifted binary phase shift keying ($\pi/2$ shifted binary phase shift keying, $\pi/2$-BPSK) modulation, amplitude phase shift keying (amplitude phase shift keying, APSK) modulation, non-uniform QAM modulation, and the like, and y(k) is a signal to be mapped to the subcarrier.

When the waveform is the DFT-s-OFDM, the functional module of the communication system provided in this embodiment of this application is shown in FIG. 2. Operations of a transmit end include source bit generation, coding, QAM modulation, PTRS generation, mapping/sorting (referring to mapping of a QAM symbol of data before DFT and a QAM symbol of a PTRS), DFT, and RE mapping (mapping of a DFT-s-OFDM symbol to a specified frequency domain resource). Operations of a receive end include channel equalization (including channel estimation), RE demapping, inverse discrete Fourier transformation (inverse discrete Fourier transformation, IDFT), PTRS obtaining and phase noise estimation/compensation, QAM demodulation, decoding, and the like.

IFFT in FIG. 2 is an inverse fast Fourier transform (inverse fast Fourier transformation). A CP in FIG. 2 is merely used as an example, and may further include at least one of frequency domain spectrum shaping, serial-to-parallel conversion, parallel-to-serial conversion, a DAC (digital-to-analog converter), a PA (power amplifier), an LNA (low noise amplifier), and an ADC (analog-to-digital converter).

At the receive end, after channel equalization is completed in frequency domain, an IDFT operation is performed on a signal on a subcarrier in scheduled bandwidth on a same OFDM symbol, to restore a transmitted signal.

When the waveform is the CP-OFDM, that is, there is no DFT operation at the transmit end and no IDFT operation at the receive end in FIG. 2.

Figure 3:
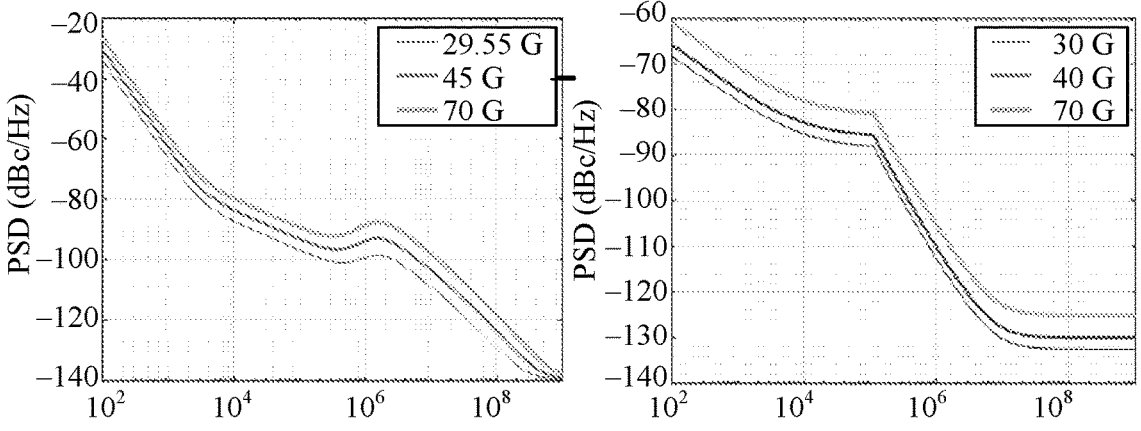
FIG. 3 is a schematic diagram of phase noise power spectral densities at different frequencies in different phase noise models.

FIG. 3 is a schematic diagram of phase noise power spectral densities at different frequencies in different phase noise models.

In FIG. 3, a horizontal coordinate is a frequency offset value, and a vertical coordinate is a phase noise power spectral density. A left figure is a schematic diagram of a phase noise power spectral density of a phase noise model 1, and a right figure is a schematic diagram of a phase noise power spectral density of a phase noise model 2.

Figure 4:
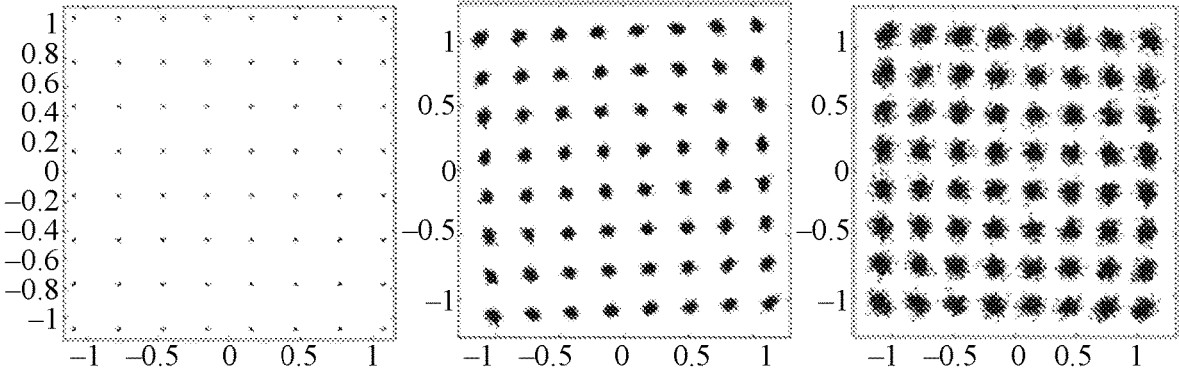
FIG. 4 is a schematic diagram of impact of phase noise at different levels on a frequency domain received signal.

FIG. 4 is a schematic diagram of impact of phase noise at different levels on a frequency domain received signal.

In FIG. 4, a left figure is a schematic diagram of impact of no phase noise on a frequency domain received signal, a middle figure is a schematic diagram of impact of weak phase noise on a frequency domain received signal, and a right figure is a schematic diagram of impact of high phase noise on a frequency domain received signal.

It can be learned from FIG. 3 and FIG. 4 that, when a frequency band increases, phase noise deteriorates, and consequently demodulation performance deteriorates. In an existing NR protocol, a PTRS is introduced for both a CP-OFDM waveform and a DFT-s-OFDM waveform, to compensate for impact caused by phase noise, thereby improving demodulation performance when there is phase noise.

Figure 5:
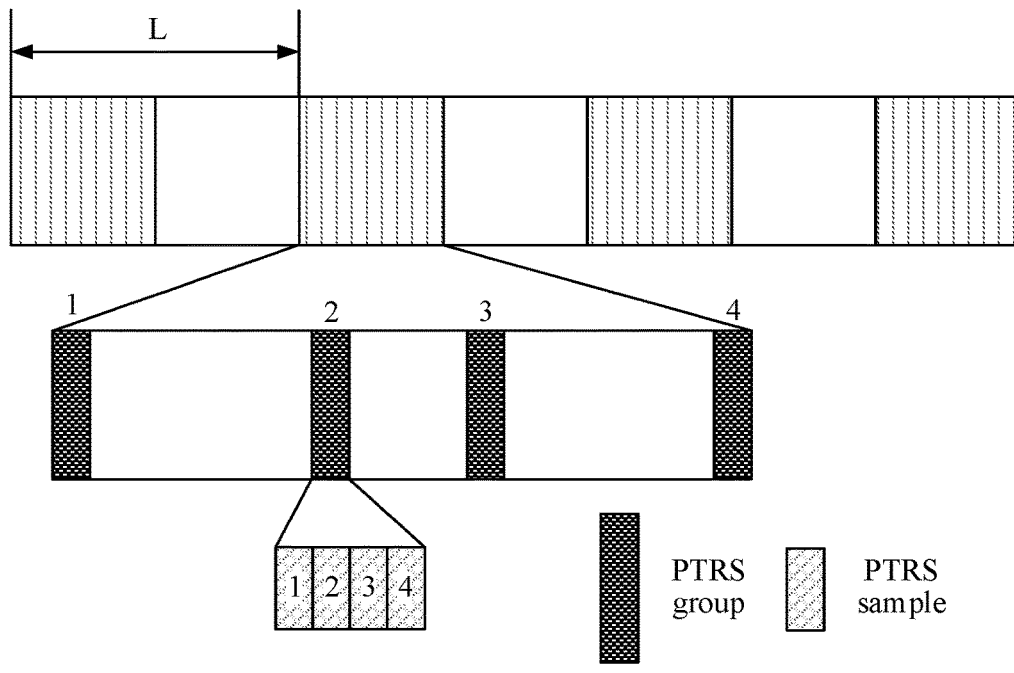
FIG. 5 is a schematic diagram of a PTRS pattern according to an embodiment of this application.

FIG. 5 is a schematic diagram of a PTRS pattern according to an embodiment of this application.

A DFT-s-OFDM waveform is used as an example. As shown in FIG. 5, a symbol-level time domain density of the PTRS pattern is L, that is, a PTRS is mapped to one symbol in every L symbols. For example, in a symbol to which a PTRS is mapped, a quantity of PTRS groups is 4, that is, the symbol to which the PTRS is mapped includes four PTRS groups, and a quantity of samples in the PTRS group is 4, that is, each PTRS group includes four PTRS samples. The quantity of PTRS groups and the quantity of samples in the PTRS group that are shown in FIG. 5 are a PTRS pattern in a 4×4 case shown in FIG. 6.

In this embodiment of this application, the PTRS group includes one or more consecutive PTRS signals, and the PTRS sample (sample) may be one PTRS signal.

Figure 6:
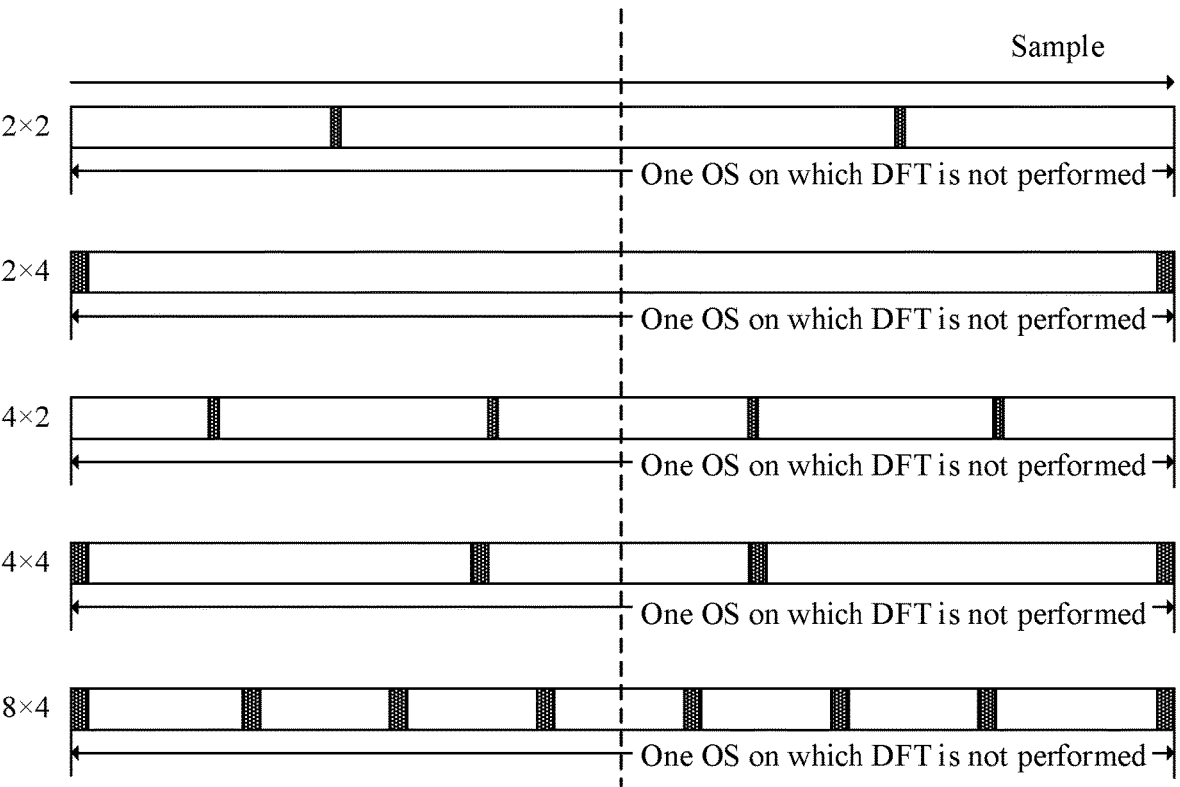
FIG. 6 is a schematic diagram of a mapping location of a PTRS pattern according to an embodiment of this application.

FIG. 6 is a schematic diagram of a mapping location of a PTRS pattern according to an embodiment of this application.

A specific step in which a network device determines a specific location of a PTRS in one DFT-s-OFDM symbol includes the following.

(1) A quantity (that is, a quantity of subcarriers, namely, $$M_{SC}^{PUSCH}$$

shown in a table) of all quadrature amplitude modulation (quadrature amplitude modulation, QAM) symbols included in one DFT-s-OFDM signal is equally divided into N (a quantity of PTRS groups) gaps.

(2) FIG. 6 shows a specific mapping location of a PTRS group for different quantities of samples. For example, if the PTRS pattern is N×M=4×2, a quantity M of samples in the PTRS group is 2, and one PTRS group is mapped to a middle of each gap. If the PTRS pattern is N×M=4×4, a quantity M of samples in the PTRS group is 4, the $1^{st}$ PTRS group is mapped to a header of the $1^{st}$ gap, the last PTRS group is mapped to a tail of the last gap, and another PTRS group is mapped to a middle of the gap.

The PTRS pattern of DFT-s-OFDM is determined based on scheduled bandwidth, as shown in Table 1 below, where $N_{RBi}$ (i=0, 1, 2, 3, or 4) is a threshold, and may be configured by the network device for a terminal device by using higher layer signaling. In a subsequent data transmission process, both a base station and the terminal device determine a specific PTRS pattern parameter in current data transmission based on Table 1 and the current scheduled bandwidth configured by the network device for the terminal device. For example, when the scheduled bandwidth $N_{RB}$ configured by the network device meets a condition $N_{RB2} \le N_{RB} < N_{RB3}$, both the network device and the terminal device may determine, based on Table 1, that the quantity of PTRS groups in the PTRS pattern is 4, and the quantity of PTRS samples in the PTRS group is 2.

TABLE 1

Relationship between the PTRS pattern
and the scheduled bandwidth

| Scheduled bandwidth | Quantity N of PTRS groups | Quantity M of samples in each PTRS group |
|---|---|---|
| $N_{RB0} \le N_{RB} < N_{RB1}$ | 2 | 2 |
| $N_{RB1} \le N_{RB} < N_{RB2}$ | 2 | 4 |
| $N_{RB2} \le N_{RB} < N_{RB3}$ | 4 | 2 |
| $N_{RB3} \le N_{RB} < N_{RB4}$ | 4 | 4 |
| $N_{RB4} \le N_{RB}$ | 8 | 4 |

After two parameters, namely, the quantity of PTRS groups and the quantity of PTRS samples in the PTRS group, are determined, both the network device and the terminal device determine the specific location of the PTRS in the DFT-s-OFDM symbol according to a rule predefined in a protocol (TS 38.211), as shown in Table 2 below.

TABLE 2

PTRS symbol mapping table

| Quantity of PTRS groups $N_{group}^{PTRS}$ | Quantity of samples in each PTRS group $N_{samp}^{group}$ | Index m of a PTRS sample in an OFDM symbol l before precoding transformation |
|---|---|---|
| 2 | 2 | $s\left\lfloor \dfrac{M_{SC}^{PUSCH}}{4} \right\rfloor + k - 1; s = 1$ or 3 and $k = 0$ or 1 |
| 2 | 4 | $sM_{SC}^{PUSCH} + k; \begin{cases} s = 0 \text{ and } k = 0, 1, 2, \text{ or } 3 \\ s = 0 \text{ and } k = -4, -3, -2, \text{ or } -1 \end{cases}$ |
| 4 | 2 | $s\left\lfloor \dfrac{M_{SC}^{PUSCH}}{8} \right\rfloor + k - 1; s = 1, 3, 5,$ or 7 and $k = 0$ or 1 |
| 4 | 4 | $s\dfrac{M_{SC}^{PUSCH}}{4} + n + k;$<br>$s = 0, k = 0, 1, 2,$ or 3, and $n = 0$<br>$s = 1$ or $2, k = -2, -1, 0,$ or 1, and $n = \left\lfloor \dfrac{M_{SC}^{PUSCH}}{8} \right\rfloor$<br>$s = 4, k = -4, -3, -2,$ or $-1,$ and $n = 0$ |
| 8 | 4 | $s\left\lfloor \dfrac{M_{SC}^{PUSCH}}{8} \right\rfloor + n + k;$<br>$s = 0, k = 0, 1, 2,$ or 3, and $n = 0$<br>$s = 1, 2, 3, 4, 5,$ or $6, k = -2, -1, 0,$ or 1, and<br>$n = \left\lfloor \dfrac{M_{SC}^{PUSCH}}{16} \right\rfloor$<br>$s = 8, k = -4, -3, -2,$ or $-1,$ and $n = 0$ |

In the protocol TS 38.331, a value range of the threshold that is configured by using the higher layer signaling and that is sent by the network device to the terminal device is 1 to 276. In an actual case, there may be a problem that a ratio of a total quantity (that is, a product of N and M) of samples of a PTRS or a total quantity of QAM symbols of the PTRS in one DFT-s-OFDM symbol to a quantity of subcarriers (which represents only one DFT-s-OFDM symbol herein) included in the scheduled bandwidth is large or even exceeds 1. In this case, there is a phenomenon that corresponding PTRSs at some locations are not unique. For example, one location corresponds to a plurality of PTRS signals.

Figure 7:
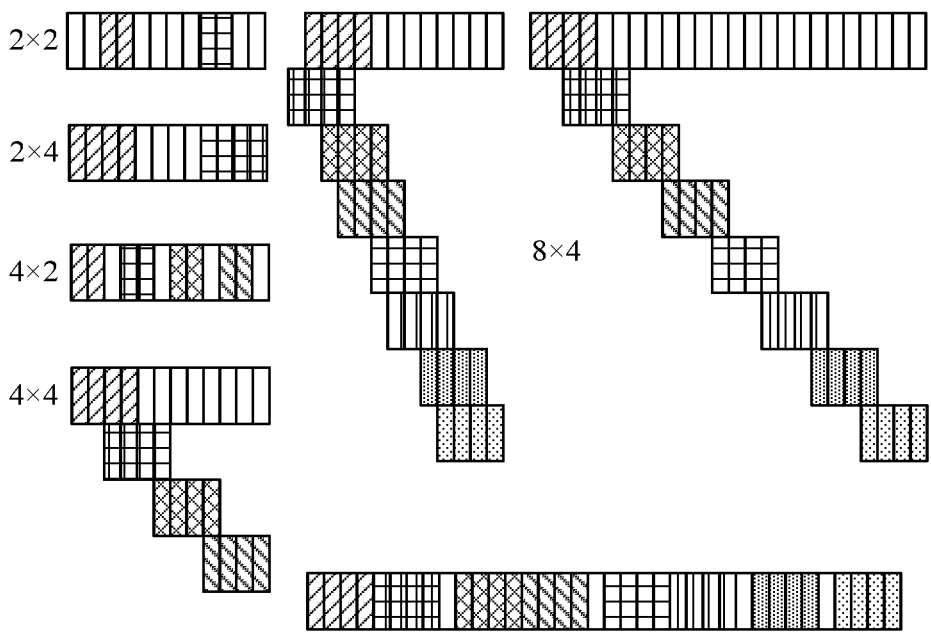
FIG. 7 is a schematic diagram of mapping different PTRS patterns in different scheduled bandwidth according to an embodiment of this application.

FIG. 7 is a schematic diagram of mapping different PTRS patterns in different scheduled bandwidth.

In FIG. 7, a DFT-s-OFDM waveform and scheduled bandwidth of 1 to 3 resource blocks (resource blocks, RBs) are used as examples. As shown in FIG. 7, when a PTRS pattern in one RB is (N, M)=(4, 4) or (N, M)=(8, 4), or PTRS patterns in two RBs are (N, M)=(8, 4), PTRS groups overlap, or there are a plurality of PTRS samples at a same location/ resource. To be specific, the PTRS sample corresponding to the same location/resource is not unique. In this case, a terminal device and a base station cannot perform a next operation. In addition, in this case, there is no remaining location or resource that is for mapping data and that is in the scheduled bandwidth.

When PTRS patterns in three RBs are (N, M)=(8, 4), consecutive PTRS groups appear. To be specific, there is no location or resource for mapping data between at least two PTRS groups. In this case, a resource that is for mapping data and that is in the scheduled bandwidth is far less than a total quantity of samples of the PTRS. When a PTRS pattern in one RB is (N, M)=(4, 2), there is also a problem that a resource that is for mapping data and that is in the scheduled bandwidth is far less than a total quantity of samples of the PTRS, that is, an overhead of the PTRS is high.

In the protocol TS 38.214, before calculating a TBS, a quantity of valid REs that carry data in total time-frequency resources in the scheduled bandwidth needs to be first calculated, and then a specific TBS is determined based on a quantity of layers, a modulation order, a bit rate, and the like. A formula for calculating a quantity of first REs in the scheduled bandwidth is as follows:

$$N_{RE} = \min(156, N'_{RE}) \cdot n_{PRB} \tag{2}$$

$$N'_{RE} = N_{sc}^{RB} \cdot N_{symb}^{sh} - N_{DMRS}^{PRB} - N_{oh}^{PRB} \tag{3}$$

$$N'_{RE}$$

is a quantity of first REs in one RB, $n_{PRB}$ is a quantity of RBs scheduled for the terminal device, $$N_{sc}^{RB}$$

is a quantity of subcarriers included in one RB, where a value of $$N_{sc}^{RB}$$

may be 12, $$N_{symb}^{sh}$$

is a quantity of DFT-s-OFDM symbols for carrying data in time domain, $$N_{DMRS}^{PRB}$$

is a quantity of REs occupied by a demodulation reference signal (demodulation reference signal, DMRS) in one RB, and $$N_{oh}^{PRB}$$

is a comprehensive overhead of a higher layer signaling configuration, and may be set to 6, 12, or 18. If there is no comprehensive overhead, the comprehensive overhead is set to 0.

It should be understood that total time-frequency domain resources in one RB may be 12×14=168, where 12 is a quantity of subcarriers in one RB, and 14 is a quantity of time domain symbols in one slot. Certainly, quantities of time domain symbols in one slot in different systems are different. A specific quantity of time domain symbols in one slot is not specifically limited in this application.

The comprehensive overhead is a comprehensive overhead of all non-data channels, reference signals, or the like, and is different from an actual overhead. To be specific, the overhead of the PTRS is not separately considered when the TBS is calculated. When it is clear that the overhead of the PTRS is greater than the configuration overhead, and when data corresponding to the TBS calculated based on the configuration overhead is mapped to an actually valid resource, it is clear that an actual bit rate is higher than a bit rate indicated by a configured modulation and coding scheme (modulation and coding scheme, MCS), or even the actual bit rate may exceed 1. Consequently, performance deteriorates, and spectral efficiency decreases.

Figure 8:
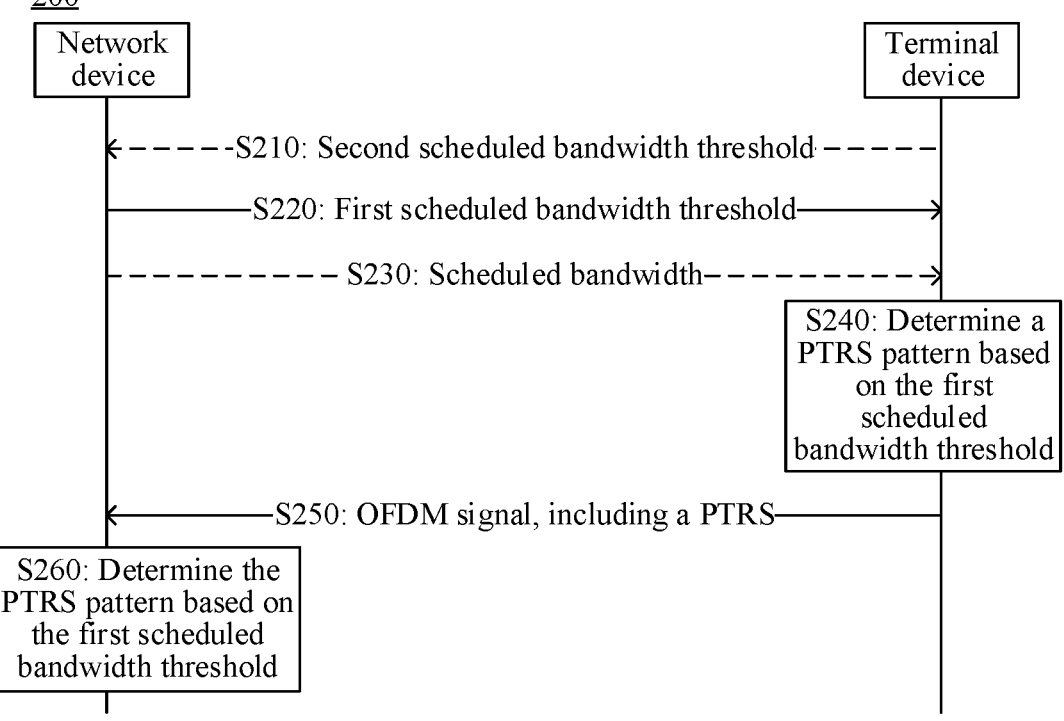
FIG. 8 is an interaction flowchart of determining a PTRS pattern according to an embodiment of this application.

FIG. 8 is an interaction flowchart of determining a PTRS pattern according to an embodiment of this application. A method 200 shown in FIG. 8 includes the following steps.

Step S220: A network device sends first scheduled bandwidth threshold information to a terminal device. Correspondingly, the terminal device receives the first scheduled bandwidth threshold information from the network device, where a first scheduled bandwidth threshold indicated by the first scheduled bandwidth threshold information meets a first condition, and the first condition includes at least one of the following: modulation symbols of different PTRSs in a PTRS pattern determined based on the first scheduled bandwidth threshold correspond to different mapping locations, modulation symbols of PTRSs in different PTRS groups in the PTRS pattern determined based on the first scheduled bandwidth threshold correspond to discontinuous mapping locations, and a ratio of a total quantity of modulation symbols in the PTRS pattern determined based on the first scheduled bandwidth threshold to a quantity of subcarriers in scheduled bandwidth is less than or equal to a first threshold. The total quantity of modulation symbols of the PTRS is a product of a quantity of PTRS groups and a quantity of modulation symbols in the PTRS group, and the scheduled bandwidth is minimum scheduled bandwidth corresponding to the determined PTRS pattern.

It should be understood that, that the ratio of the total quantity of modulation symbols in the PTRS pattern determined based on the first scheduled bandwidth threshold to the quantity of subcarriers in the scheduled bandwidth is less than or equal to the first threshold is a condition that a PTRS pattern on one OFDM symbol needs to meet. From a perspective of an entire scheduled resource, the foregoing condition may be further understood as that a ratio of a product of a quantity of symbols to which the PTRS is mapped and the total quantity of modulation symbols in the PTRS pattern determined based on the first scheduled bandwidth threshold to a total quantity of REs in a scheduled time-frequency resource is less than or equal to a third threshold.

Optionally, the first scheduled bandwidth threshold information may indicate the first scheduled bandwidth threshold, or the first scheduled bandwidth threshold information includes the first scheduled bandwidth threshold. The first scheduled bandwidth threshold information may be carried in higher layer signaling, for example, radio resource control (radio resource control, RRC) signaling.

The following uses a DFT-s-OFDM waveform as an example.

(1) To meet a requirement that the modulation symbols of the PTRSs in the different PTRS groups in the PTRS pattern correspond to the different mapping locations, the first scheduled bandwidth threshold needs to meet the first condition. For example, a quantity of REs included in minimum scheduled bandwidth in each scheduled bandwidth range defined by the first scheduled bandwidth threshold≥a total quantity of samples included in a PTRS pattern corresponding to the scheduled bandwidth range. That is:

$$N_{RBi} \times N_{sc}^{RB} \geq N_i \times M_i \qquad (4)$$

$N_{RBi}$ is a scheduled bandwidth threshold of a left inequality in an $(i+1)^{th}$ row in Table 1, $N_i$ is a quantity of PTRS groups corresponding to the $(i+1)^{th}$ row, n is a quantity of PTRS samples in the PTRS group corresponding to the row, where i=0, 1, 2, 3, or 4, and $$N_{sc}^{RB}$$

is a quantity of subcarriers included in one RB, where a value of $$N_{sc}^{RB}$$

may be 12.

The values of $N_i$ and $M_i$ defined in Table 1 are used as examples, and $N_{RB0} \geq 1, N_{RB1} \geq 1, N_{RB2} \geq 1, N_{RB3} \geq 2$, and $N_{RB4} \geq 3$.

Optionally, a minimum value of each first scheduled bandwidth threshold may not be separately defined, but a unified first scheduled bandwidth threshold may be directly defined, so that overlap does not occur in a PTRS pattern corresponding to a maximum quantity of PTRS samples. For example, all first scheduled bandwidth thresholds are greater than or equal to 3.

(2) To meet a requirement that the modulation symbols of the PTRSs in the different PTRS groups in the PTRS pattern correspond to the discontinuous mapping locations, the first scheduled bandwidth threshold needs to meet the first condition. For example, a quantity of REs included in minimum scheduled bandwidth in each scheduled bandwidth range defined by the first scheduled bandwidth threshold≥a total quantity of samples included in a PTRS pattern corresponding to the scheduled bandwidth range+a quantity of PTRS groups-1. That is:

$$N_{RBi} \times N_{sc}^{RB} \geq N_i \times M_i + N_i - 1 \qquad (5)$$

The values of $N_i$ and $M_i$ defined in Table 1 are used as examples, and $N_{RB0} \geq 1, N_{RB1} \geq 1, N_{RB2} \geq 1, N_{RB3} \geq 2$, and $N_{RB4} \geq 4$.

Optionally, a minimum value of each first scheduled bandwidth threshold may not be separately defined, but a unified first scheduled bandwidth threshold may be directly defined, so that overlap or continuity does not occur in a PTRS pattern corresponding to a maximum quantity of PTRS samples. For example, all first scheduled bandwidth thresholds are greater than or equal to 4.

(3) To meet a requirement that the ratio of the total quantity of modulation symbols in the PTRS pattern to the quantity of subcarriers in the scheduled bandwidth is less than or equal to the first threshold, or the ratio of the product of the quantity of symbols to which the PTRS is mapped and the total quantity of modulation symbols in the PTRS pattern to the total quantity of REs in the scheduled time-frequency resource is less than or equal to the third threshold, the first scheduled bandwidth threshold needs to meet the first condition. For example, a total quantity of samples included in the PTRS pattern/a quantity of REs included in minimum bandwidth≤X, where X is the first threshold, that is:

$$N_{RBi} \times N_{sc}^{RB} \times X \geq N_i \times M_i \qquad (6)$$

The values of $N_i$ and $M_i$ defined in Table 1 are used as examples.

When a value of X is $1/12$:

$N_{RB0} \geq 4, N_{RB1} \geq 8, N_{RB2} \geq 8, N_{RB3} \geq 16$, and $N_{RB4} \geq 32$.

When the value of X is $1/24$:

$N_{RB0} \geq 8, N_{RB1} \geq 16, N_{RB2} \geq 16, N_{RB3} \geq 32$, and $N_{RB4} \geq 64$.

When the value of X is $10/100$:

$N_{RB0} \geq 4, N_{RB1} \geq 7, N_{RB2} \geq 7, N_{RB3} \geq 14$, and $N_{RB4} \geq 27$.

When the value of X is $5/100$:

$N_{RB0} \geq 6, N_{RB1} \geq 12, N_{RB2} \geq 12, N_{RB3} \geq 23$, and $N_{RB4} \geq 45$.

The minimum value of each first scheduled bandwidth threshold may be determined based on the foregoing three types of cases.

Optionally, the minimum value of the first scheduled bandwidth threshold may be in capability reporting of the terminal device, or may be in the higher layer signaling configured by the network device for the terminal device. To be specific, a value range of a second scheduled bandwidth threshold reported by the terminal device and/or a value range of the first scheduled bandwidth threshold configured by the network device for the terminal device meet/meets the first condition.

It should be understood that the first scheduled bandwidth threshold includes a plurality of scheduled bandwidth thresholds such as $N_{RB0}$, $N_{RB1}$, $N_{RB2}$, $N_{RB3}$, and $N_{RB4}$.

If the minimum values of the first scheduled bandwidth thresholds are different, a value range of each scheduled bandwidth threshold needs to be independently defined, and an RRC signaling format is shown as follows, where $n_{i\text{-}min}$ is the minimum value of each scheduled bandwidth threshold $N_{RBi}$ determined according to the method:

```
PTRS-UplinkConfig ::=                SEQUENCE {
    ...
    transformPrecoderEnabled         SEQUENCE {
        sampleDensity-0              SEQUENCE (SIZE (5)) OF
    INTEGER (n₀₋ₘᵢₙ..276),
        sampleDensity-1              SEQUENCE (SIZE (5)) OF
    INTEGER (n₁₋ₘᵢₙ..276),
        sampleDensity-2              SEQUENCE (SIZE (5)) OF
    INTEGER (n₂₋ₘᵢₙ..276),
        sampleDensity-3              SEQUENCE (SIZE (5)) OF
    INTEGER (n₃₋ₘᵢₙ..276),
        sampleDensity-4              SEQUENCE (SIZE (5)) OF
    INTEGER (n₄₋ₘᵢₙ..276),
        timeDensityTransformPrecoding   ENUMERATED {d2}
    OPTIONAL     -- Need S
    }
    OPTIONAL,     -- Need R
    ...
    }
```

If the minimum values of the first scheduled bandwidth thresholds are the same, an existing protocol format may be used, and the minimum value may be changed. An RRC signaling format is shown as follows, where $n_{min}$ is the minimum value:

```
PTRS-UplinkConfig ::=                SEQUENCE {
    ...
    transformPrecoderEnabled         SEQUENCE {
        sampleDensity                SEQUENCE (SIZE (5)) OF
    INTEGER (nₘᵢₙ..276),
        timeDensityTransformPrecoding   ENUMERATED {d2} OPTIONAL
    -- Need S
    }
    OPTIONAL,     -- Need R
    ...
    }
```

Optionally, the minimum value and the value range of each scheduled bandwidth threshold when a capability of the terminal device is reported are not limited. The network device uses a result of $\max(N_{RBi\text{-}min}, N_{RBi\text{-}report})$ as a scheduled bandwidth threshold reported by the terminal device, where $N_{RBi\text{-}min}$ is the minimum value of the first scheduled bandwidth threshold $N_{RBi}$ determined in at least one of the foregoing three cases, and $N_{RBi\text{-}report}$ is a value of the scheduled bandwidth threshold $N_{RBi}$ reported by the terminal device as a capability.

Optionally, the minimum value and the value range of each scheduled bandwidth threshold configured by the network device are not limited. Both the network device and the terminal device use a result of $\max(N_{RBi\text{-}min}, N_{RBi\text{-}config})$ as the scheduled bandwidth threshold configured by the network device, where $N_{RBi\text{-}config}$ is a value of the scheduled bandwidth threshold configured by the network device in RRC signaling, and $N_{RBi\text{-}min}$ is the same as that described above.

Optionally, the method 200 further includes step S210: The terminal device determines the second scheduled bandwidth threshold based on the capability of the terminal device, and sends second scheduled bandwidth threshold information to the network device, where the second scheduled bandwidth threshold information indicates the second scheduled bandwidth threshold.

Optionally, each scheduled bandwidth threshold in the second scheduled bandwidth threshold meets the value range of each scheduled bandwidth threshold in the first scheduled bandwidth threshold.

It should be understood that in this solution, the terminal device may actively report the second scheduled bandwidth threshold based on the capability of the terminal device, so that the network device may refer to the second scheduled bandwidth threshold when configuring the first scheduled bandwidth threshold. For example, the terminal device reports a group of small scheduled bandwidth thresholds when chip quality is poor or a phase noise level is poor, so that a total quantity of PTRS modulation symbols corresponding to the scheduled bandwidth $N_{RB}$ is large, and is greater than or equal to a total quantity of PTRS modulation symbols corresponding to, in the same scheduled bandwidth, a scheduled bandwidth threshold reported by a terminal device with high chip quality or a good phase noise level. In this way, the scheduled bandwidth threshold configured by the network device better matches performance of the current terminal device.

Optionally, the method 200 further includes step S230: The network device sends scheduled bandwidth information to the terminal device, where the scheduled bandwidth information indicates bandwidth allocated by the network device to the terminal device. Correspondingly, the terminal device may determine the scheduled bandwidth based on the scheduled bandwidth information.

Optionally, the scheduled bandwidth information may be carried in downlink control information (downlink control information, DCI).

Step S240: The terminal device determines the PTRS pattern based on the scheduled bandwidth threshold configured by the network device.

Optionally, the terminal device determines a PTRS pattern on one OFDM symbol in an OFDM signal based on the scheduled bandwidth threshold and the scheduled bandwidth.

In an implementation, the terminal device determines, in Table 1 based on the first scheduled bandwidth threshold configured by the network device in the higher layer signaling, the PTRS pattern corresponding to the scheduled bandwidth, where the first scheduled bandwidth threshold meets the first condition.

In another implementation, the terminal device uses the result of the $\max(N_{RBi\text{-}min}, N_{RBi\text{-}config})$ as the scheduled bandwidth threshold in Table 1, and determines, based on Table 1, the PTRS pattern corresponding to the scheduled bandwidth. $N_{RBi\text{-}min}$ is the minimum value of the first scheduled bandwidth threshold $N_{RBi}$ that meets the first condition, and $N_{RBi\text{-}config}$ is the value of the scheduled bandwidth threshold configured by the network device in the RRC signaling.

It should be understood that, in this solution, the scheduled bandwidth threshold configured by the network device in the RRC signaling may meet the first condition, or may not meet the first condition. The scheduled bandwidth threshold is different from the first scheduled bandwidth threshold mentioned above.

In still another implementation, the terminal device determines a first PTRS pattern on one OFDM symbol in an OFDM signal based on a third scheduled bandwidth threshold and scheduled bandwidth, where the first PTRS pattern meets a second condition, and the second condition includes at least one of the following: modulation symbols of different PTRSs in the first PTRS pattern correspond to different mapping locations, modulation symbols of PTRSs in different PTRS groups in the first PTRS pattern correspond to discontinuous mapping locations, and a ratio of a total quantity of modulation symbols in the first PTRS pattern to a quantity of subcarriers in the scheduled bandwidth is less than or equal to a first threshold. The first PTRS pattern includes at least one PTRS group, and each PTRS group includes at least one modulation symbol. The total quantity of modulation symbols of the PTRS is a product of a quantity of PTRS groups and a quantity of modulation symbols in the PTRS group, and the scheduled bandwidth is bandwidth allocated by the network device to the terminal device.

Optionally, before the terminal device determines the first PTRS pattern, the terminal device determines a second PTRS pattern based on the third scheduled bandwidth threshold and the scheduled bandwidth, and if the second PTRS pattern does not meet the second condition, determines the first PTRS pattern on the OFDM symbol in the OFDM signal based on the second PTRS pattern, where the first PTRS pattern is obtained by reducing a quantity of PTRS groups in the second PTRS pattern and/or reducing a quantity of modulation symbols in the PTRS group in the second PTRS pattern. Optionally, the first PTRS pattern may be one PTRS pattern in a PTRS pattern set.

Optionally, when determining that the second PTRS pattern does not meet the second condition, the terminal device sequentially selects patterns in the PTRS pattern set in descending order until the first PTRS pattern that meets the second condition is obtained, or determines, based on the scheduled bandwidth, a total quantity of modulation symbols of the PTRS that meets the second condition, and then selects the first PTRS pattern corresponding to a maximum quantity of PTRS modulation symbols that is less than or equal to the total quantity of modulation symbols.

Optionally, the third scheduled bandwidth threshold may be determined based on an existing protocol. For example, a value range of the third scheduled bandwidth threshold is 1 to 276.

It should be understood that the PTRS pattern set is a set including a PTRS pattern corresponding to each of scheduled bandwidth ranges determined by the terminal device based on a scheduled bandwidth threshold in the existing protocol, that is, the third scheduled bandwidth threshold. For example, the PTRS pattern set includes five PTRS patterns shown in Table 1, and the PTRS pattern set is {(2, 2), (2, 4), (4, 2), (4, 4), (8, 4)}. The foregoing is merely an example. The PTRS pattern set is not specifically limited in this application.

The following uses a DFT-s-OFDM waveform as an example.

The second PTRS pattern determined by the terminal device based on the third scheduled bandwidth threshold, the scheduled bandwidth, and Table 1 does not meet the second condition.

For example, if the PTRS pattern determined based on Table 1 is configured as (N, M)=(8, 4), at least one of the following occurs: modulation symbols of different PTRSs in the second PTRS pattern correspond to a same time-frequency resource; modulation symbols of PTRSs in different PTRS groups in the second PTRS pattern correspond to continuous time-frequency resources; and a ratio of a total quantity of modulation symbols in the second PTRS pattern to a quantity of subcarriers in the scheduled bandwidth is greater than the first threshold.

The first PTRS pattern may be determined based on the second PTRS pattern. For example, new PTRS patterns are sequentially selected, for example, (N, M)=(4, 4), (4, 2), or (2, 2), and even no PTRS is sent until the new PTRS pattern meets the second condition. In this case, the $1^{st}$ new PTRS pattern that meets the condition is the first PTRS pattern. If the second PTRS pattern determined based on Table 1 is configured as (N, M)=(4, 4), it may be determined that the first PTRS pattern is (N, M)=(4, 2) or (2, 2), and even no PTRS is sent until the first PTRS pattern meets the second condition. Others can be deduced by analogy.

For another example, the scheduled bandwidth ($N_{RB}$) is 24 RBs, $N_{RB4}$=20, and the first threshold is $1/12$. If it can be learned from Table 1 that the second PTRS pattern should be (N, M)=(8, 4), a ratio of a total quantity of PTRS samples to the quantity of subcarriers in the scheduled bandwidth is 32/(24×12), and is greater than $1/12$. Therefore, the second PTRS pattern needs to be adjusted to (N, M)=(4, 4). In this case, a ratio of a total quantity of PTRS samples to the quantity of subcarriers in the scheduled bandwidth is 16/(24×12), and is less than $1/12$. To be specific, a condition that the ratio of the quantity of PTRS samples to the quantity of subcarriers in the scheduled bandwidth does not exceed a threshold is met. Alternatively, it is determined, based on the first threshold and the scheduled bandwidth, that a total quantity of PTRS samples that meet the condition is 24, and then the $1^{st}$ PTRS pattern whose total quantity of samples is less than or equal to 24 is selected from the table, that is, (N, M)=(4, 4) as the first PTRS pattern.

Step S250: The terminal device sends the OFDM signal to the network device, where the OFDM signal includes the PTRS.

Step S260: The network device determines the PTRS pattern based on the configured scheduled bandwidth threshold, and performs phase noise estimation and compensation based on the received PTRS, to complete data demodulation.

Optionally, the network device determines the PTRS pattern based on the configured scheduled bandwidth threshold and the scheduled bandwidth.

It should be understood that a process in which the network device determines the PTRS pattern based on the scheduled bandwidth threshold and the scheduled bandwidth corresponds to a process in which the terminal device determines the PTRS pattern. For a detailed process, refer to the descriptions of a process in which the terminal device determines the PTRS pattern based on the scheduled bandwidth threshold and the scheduled bandwidth in step S240. Details are not described herein again.

It should be further understood that, in addition to the parameters: namely, the scheduled bandwidth threshold and the scheduled bandwidth, the terminal device and the network device may alternatively determine the PTRS pattern based on another parameter, for example, a modulation and coding scheme (modulation and coding scheme, MCS) threshold or an MCS. This is not specifically limited herein in this application. FIG. 9 is a schematic diagram of determining a first resource element according to an embodiment of this application. A method 300 shown in FIG. 9 may be applied to a terminal device or a network device, and the method 300 includes the following steps.

Step S310: Determine a first overhead of a PTRS, where the first overhead of the PTRS is determined based on a total quantity of modulation symbols of the PTRS, a quantity of resource blocks scheduled for the terminal device, and a time domain density of the PTRS, and the total quantity of modulation symbols of the PTRS is a product of a quantity of PTRS groups and a quantity of modulation symbols in the PTRS group.

The following uses a DFT-s-OFDM waveform as an example.

Optionally, the first overhead $$N_{PTRS}^{PRB}$$

of the PTRS is an actual overhead of the PTRS, and the first overhead of the PTRS meets the following formula:

$$N_{PTRS}^{PRB} = \left\lceil \frac{N \cdot M}{n_{PRB} \cdot L} \right\rceil \quad (7)$$

L is the time domain density of the PTRS, L=1 indicates that the PTRS is mapped to each DFT-s-OFDM symbol, and L=2 indicates that the PTRS is mapped to one of every two DFT-s-OFDM symbols. Others can be deduced by analogy.

If a real time domain density is considered, the first overhead $$N_{PTRS}^{PRB}$$

of the PTRS may further meet the following formula:

$$N_{PTRS}^{PRB} = \left\lceil \frac{N \cdot M \cdot L_{real}}{n_{PRB} \cdot N_{symb}^{sh}} \right\rceil \quad (8)$$

$L_{real}$ is a quantity of symbols to which the PTRS is mapped on scheduled $$\left( N_{symb}^{sh} \right)^{th} DFT-s-OFDM$$

symbols, $$N_{symb}^{sh}$$

is a quantity of DFT-s-OFDM symbols for carrying data in time domain, and $n_{PRB}$ is a quantity of scheduled RBs.

Step S320: Determine a second overhead of the PTRS based on the first overhead of the PTRS when the first overhead of the PTRS is greater than or equal to a second threshold.

It should be understood that the second threshold may be predefined or preconfigured, or may be adjusted based on a modulation and coding scheme (modulation and coding scheme, MCS). When the first overhead of the PTRS is less than the second threshold, a quantity of valid resource elements to which data is mapped is calculated without considering the overhead of the PTRS, and the overhead of the PTRS does not cause a difference between an equivalent MCS index corresponding to an actual bit rate and a configured MCS index to be greater than or equal to Z, where a value of Z may be 1 or 2. In other words, the second threshold may be determined reversely based on Z.

Optionally, the second overhead of the PTRS is the first overhead of the PTRS or a quantization overhead of the PTRS, and the quantization overhead of the PTRS is determined based on the first overhead of the PTRS and a quantization interval.

Step S330: The terminal device or the network device determines, based on an overhead of a demodulation reference signal (demodulation reference signal, DMRS), a comprehensive overhead of a higher layer signaling configuration, and the second overhead of the PTRS, a quantity of first resource elements to which data is mapped.

It should be understood that the first RE is a valid resource element to which data can be mapped, and the terminal device or the network device determines the quantity of first REs based on at least three parameters, that is, the overhead of the demodulation reference signal DMRS, the comprehensive overhead of the higher layer signaling configuration, and the second overhead of the PTRS. Optionally, in addition to the three parameters, the terminal device or the network device may alternatively determine the quantity of first REs based on another parameter. The another parameter may be a reserved resource configuration, an unavailable resource configuration, or the like. A quantity of specific parameters used by the terminal device or the network device to determine the quantity of first REs is not limited in this solution.

Optionally, in an uplink data transmission process, before the terminal device sends the OFDM signal to the network device, if the terminal device determines that a ratio of a quantity of PTRS samples to a quantity of subcarriers in scheduled bandwidth exceeds a threshold, the terminal device needs to re-determine the quantity of first REs used to calculate a TBS (downlink data transmission can be deduced by analogy).

It should be understood that, if the overhead of the PTRS is not separately considered when the quantity of first REs is determined, and it is clear that the overhead of the PTRS is greater than the overhead $$N_{oh}^{PRB}$$

of the network device configuration, an actual transmission bit rate is higher than a bit rate indicated by an MCS configured by the network device. Therefore, in this embodiment, a method for determining the quantity of first REs used to determine the TBS is dynamically adjusted based on the overhead of the PTRS. For example, a threshold Y is defined. When the overhead of the PTRS is greater than or equal to Y, the overhead of the PTRS is subtracted when the quantity of first REs is determined. The overhead may be the actual overhead of the PTRS, or may be the quantized overhead, that is, the quantity $$N'_{RE}$$

of first REs is:

$$N'_{RE} = N^{RB}_{Sc} \cdot N^{sh}_{symb} - N^{PRB}_{DMRS} - N^{PRB}_{oh} - N^{PRB}_{PTRS} \qquad (9)$$

$$N^{RB}_{sc}$$

is a quantity of subcarriers included in one resource block RB, $$N^{PRB}_{DMRS}$$

is the overhead of the DMRS, $$N^{PRB}_{oh}$$

is the comprehensive overhead of the higher layer signaling configuration, and $$N^{PRB}_{PTRS}$$

is the second overhead of the PTRS.

Optionally, $$N^{PRB}_{PTRS}$$

may be the actual overhead of the PTRS, that is, the first overhead of the PTRS, and the first overhead of the PTRS may be calculated according to the formula (7) or formula (8).

Optionally, $$N^{PRB}_{PTRS}$$

may alternatively be the quantization overhead of the PTRS. In this case, $$N^{PRB}_{PTRS}$$

is calculated according to the formula (10):

$$N^{PRB}_{PTRS} = \left\lceil \frac{N \cdot M}{n_{PRB} \cdot L \cdot G} \right\rceil \cdot G \qquad (10)$$

G is the quantization interval, that is, the second overhead of the PTRS subtracted when the quantity of REs is calculated is an integer multiple of G. For example, a value of G may be 3 or 6.

Similarly, if the real time domain density is considered, the foregoing formula (10) may alternatively be:

$$N^{PRB}_{PTRS} = \left\lceil \frac{N \cdot M \cdot L_{real}}{n_{PRB} \cdot N^{sh}_{symb} \cdot G} \right\rceil \cdot G \qquad (11)$$

Based on the foregoing solution, when the first overhead that is of the PTRS and that is determined by the terminal device is greater than or equal to the second threshold, the overhead of the PTRS is considered when the TBS is calculated. This can avoid a problem of a high actual bit rate and low spectral efficiency caused when excessive data is mapped to a limited resource element.

It should be understood that [·] in the foregoing formula is a rounding function, and the rounding function may be rounding up, rounding down, or rounding off. This is not limited in this application. It should be further understood that when the PTRS pattern is not only associated with the scheduled bandwidth, for example, the PTRS pattern is also associated with the MCS, or the PTRS pattern is also associated with another parameter, the foregoing rules may be deduced by analogy, to ensure that the determined PTRS pattern and the scheduled bandwidth of the terminal meet the first condition.

It should be understood that the foregoing describes the method provided in embodiments by using a DFT-s-OFDM waveform as an example. However, the method provided in this application may be further applicable to a CP-OFDM waveform. This is not limited in this application. In addition, when the method 200 provided in this application is described above, uplink data transmission is used as an example, for example, FIG. 8. However, the method for determining the PTRS pattern provided in this application is further applicable to downlink data transmission. This is not limited in this application.

It should be further understood that, when the foregoing method is applied to the downlink, a signaling transmission process is the same as that described above. To be specific, the terminal device reports the scheduled bandwidth threshold based on the capability, the base station configures the scheduled bandwidth threshold, and the base station configures information such as the scheduled bandwidth. A difference is that after determining the PTRS pattern according to the foregoing rule, the base station maps the PTRS to the OFDM symbol based on the PTRS pattern, and then sends the OFDM symbol to the terminal device. The terminal device determines the PTRS pattern based on configuration information and the foregoing rule, demaps the PTRS from the OFDM symbol based on the PTRS pattern, and then completes phase noise estimation, compensation, and the like.

It should be further understood that the method 300 provided in this application for calculating the quantity of valid resource elements to which the data is mapped may also be applicable to uplink data transmission or downlink data transmission. This is not limited in this application. It should be understood that a sequence of the steps in FIG. 8 and FIG. 9 is based on internal logic of the method, and the sequence of the steps in the foregoing method embodiments is not limited in this application.

It should be noted that execution bodies shown in FIG. 8 and FIG. 9 are merely examples, and the execution bodies may alternatively be chips, chip systems, or processors that support the execution bodies in implementing the method 200 and the method 300. This is not limited in this application.

The foregoing describes the method embodiments in embodiments of this application with reference to the accompanying drawings, and the following describes apparatus embodiments in embodiments of this application. It may be understood that the descriptions of the method embodiments and the descriptions of the apparatus embodiments may correspond to each other. Therefore, for a part that is not described, refer to the foregoing method embodiments.

It may be understood that, in the foregoing method embodiments, the method and the operation implemented by the network device may alternatively be implemented by a component (for example, a chip or a circuit) that can be used in the network device, and the method and the operation implemented by the terminal device may alternatively be implemented by a component (for example, a chip or a circuit) that can be used in the terminal device.

The foregoing mainly describes the solutions provided in embodiments of this application from a perspective of interaction between network elements. It may be understood that, to implement the foregoing functions, each network element, for example, a transmit end device or a receive end device, includes a corresponding hardware structure and/or software module for performing each function. A person skilled in the art may be aware that, in combination with units and algorithm steps of the examples described in embodiments disclosed in this specification, this application can be implemented by hardware or a combination of hardware and computer software. Whether a function is performed by hardware or hardware driven by computer software depends on a particular application and a design constraint condition of the technical solutions. A person skilled in the art may use different methods to implement the described functions for each particular application, but it should not be considered that the implementation goes beyond the scope of this application.

In embodiments of this application, division into functional modules may be performed on the transmit end device or the receive end device based on the foregoing method examples. For example, division into each functional module may be performed based on each corresponding function, or two or more functions may be integrated into one processing module. The integrated module may be implemented in a form of hardware, or may be implemented in a form of a software functional module. It should be noted that, in embodiments of this application, division into the modules is an example and is merely logical function division, and may be other division in an actual implementation. An example in which division into each functional module may be performed based on each corresponding function is used below for description.

FIG. 10 is a schematic block diagram of a communication apparatus according to an embodiment of this application. The communication apparatus 400 includes a transceiver unit 410 and a processing unit 420. The transceiver unit 410 may communicate with the outside, and the processing unit 420 is configured to perform data processing. The transceiver unit 410 may also be referred to as a communication interface or a communication unit.

The communication apparatus 400 may be a terminal device. The transceiver unit 410 is configured to perform a receiving or sending operation of the terminal device in the foregoing method embodiments, and the processing unit 420 is configured to perform an internal processing operation of the terminal device in the foregoing method embodiments.

Optionally, the communication apparatus 400 may further include a storage unit. The storage unit may be configured to store instructions and/or data. The processing unit 420 may read the instructions and/or the data in the storage unit.

In a design, the transceiver unit 410 is configured to receive first scheduled bandwidth threshold information from a network device, where a first scheduled bandwidth threshold indicated by the first scheduled bandwidth threshold information meets a first condition, and the first condition includes at least one of the following: modulation symbols of different PTRSs in a PTRS pattern determined based on the first scheduled bandwidth threshold correspond to different mapping locations, modulation symbols of PTRSs of different PTRS groups in the PTRS pattern determined based on the first scheduled bandwidth threshold correspond to discontinuous mapping locations, and a ratio of a total quantity of modulation symbols in the PTRS pattern determined based on the first scheduled bandwidth threshold to a quantity of subcarriers in scheduled bandwidth is less than or equal to a first threshold. The total quantity of modulation symbols of the PTRS is a product of a quantity of PTRS groups and a quantity of modulation symbols in the PTRS group, and the scheduled bandwidth is minimum scheduled bandwidth corresponding to the determined PTRS pattern. The processing unit 420 is configured to determine a PTRS pattern on one orthogonal frequency division multiplexing OFDM symbol in an OFDM signal based on the scheduled bandwidth threshold, where the PTRS pattern includes at least one PTRS group, and each PTRS group includes at least one modulation symbol.

Optionally, the transceiver unit 410 is further configured to receive scheduled bandwidth information from the network device, where the scheduled bandwidth information indicates the scheduled bandwidth.

Optionally, the processing unit 420 is further configured to determine the PTRS pattern on the orthogonal frequency division multiplexing OFDM symbol in the OFDM signal based on the scheduled bandwidth threshold and the scheduled bandwidth, where the PTRS pattern includes at least one PTRS group, and each PTRS group includes at least one modulation symbol.

The transceiver unit 410 is further configured to receive or send the OFDM signal, where the OFDM signal includes a PTRS.

Optionally, the processing unit 420 is further used by the terminal device to determine a second scheduled bandwidth threshold based on a capability of the terminal device. The transceiver unit is further configured to send second scheduled bandwidth threshold information to the network device, where the second scheduled bandwidth threshold information indicates the second scheduled bandwidth threshold.

In another design, the processing unit 420 is configured to determine a first PTRS pattern on one orthogonal frequency division multiplexing OFDM symbol in an OFDM signal based on a third scheduled bandwidth threshold, where the first PTRS pattern meets a second condition, and the second condition includes at least one of the following: modulation symbols of different PTRSs in the first PTRS pattern correspond to different mapping locations, modulation symbols of PTRSs in different PTRS groups in the first PTRS pattern correspond to discontinuous mapping locations, and a ratio of a total quantity of modulation symbols in the first PTRS pattern to a quantity of subcarriers in scheduled bandwidth is less than or equal to a first threshold. The first PTRS pattern includes at least one PTRS group, and each PTRS group includes at least one modulation symbol. The total quantity of modulation symbols of the PTRS is a product of a quantity of PTRS groups and a quantity of modulation symbols in the PTRS group, and the scheduled bandwidth is bandwidth allocated by a network device to the terminal device.

Optionally, the terminal device determines the PTRS pattern on the OFDM symbol in the OFDM signal based on the scheduled bandwidth threshold and the scheduled bandwidth.

It should be understood that, in addition to the parameters: namely, the scheduled bandwidth threshold and the scheduled bandwidth, the terminal device may alternatively determine the PTRS pattern based on another parameter, for example, an MCS threshold or an MCS. This is not specifically limited in this application.

The transceiver unit 410 is configured to receive or send the OFDM signal, where the OFDM signal includes a PTRS.

Optionally, the processing unit 420 is further configured to: determine a second PTRS pattern based on the third scheduled bandwidth threshold and the scheduled bandwidth, and if the second PTRS pattern does not meet the second condition, determine the first PTRS pattern on the OFDM symbol in the OFDM signal based on the second PTRS pattern, where the first PTRS pattern is obtained by reducing a quantity of PTRS groups in the second PTRS pattern and/or reducing a quantity of modulation symbols in the PTRS group in the second PTRS pattern. Optionally, the first PTRS pattern may be one PTRS pattern in a PTRS pattern set.

Optionally, when determining that the second PTRS pattern does not meet the second condition, the processing unit 420 sequentially selects patterns in the PTRS pattern set in descending order until the first PTRS pattern that meets the second condition is obtained, or determines, based on the scheduled bandwidth, a total quantity of modulation symbols of the PTRS that meets the second condition, and then selects the first PTRS pattern corresponding to a maximum quantity of PTRS modulation symbols that is less than or equal to the total quantity of modulation symbols.

In still another design, the processing unit 420 is configured to determine a first overhead of a PTRS, where the first overhead of the PTRS is determined based on a total quantity of modulation symbols of the PTRS, a quantity of resource blocks scheduled for the terminal device, and a symbol-level time domain density of the PTRS, and the total quantity of modulation symbols of the PTRS is a product of a quantity of PTRS groups and a quantity of modulation symbols in the PTRS group. When the first overhead of the PTRS is greater than a second threshold, the processing unit 420 is further configured to determine a second overhead of the PTRS based on the first overhead of the PTRS. The processing unit 420 is further configured to determine, based on an overhead of a demodulation reference signal (demodulation reference signal, DMRS), a comprehensive overhead of a higher layer signaling configuration, and the second overhead of the PTRS, a quantity of first resource elements to which data is mapped.

Optionally, the quantity of first resource elements may be determined according to the following relational expression:

$$N_{RE} = N_{sc}^{RB} \times N_{symb}^{sh} - N_{DMRS}^{PRB} - N_{oh}^{PRB} - N_{PTRS}^{PRB}$$

$N_{RE}$ is the quantity of first resource elements, $$N_{sc}^{RB}$$

is a quantity of subcarriers included in one resource block RB, $$N_{DMRS}^{PRB}$$

is the overhead of the DMRS, $$N_{oh}^{PRB}$$

is the comprehensive overhead of the higher layer signaling configuration, and $$N_{PTRS}^{PRB}$$

is the second overhead of the PTRS.

Optionally, the second overhead of the PTRS is the first overhead of the PTRS or a quantization overhead of the PTRS, and the quantization overhead of the PTRS is determined based on the first overhead of the PTRS and a quantization interval.

Figure 12:
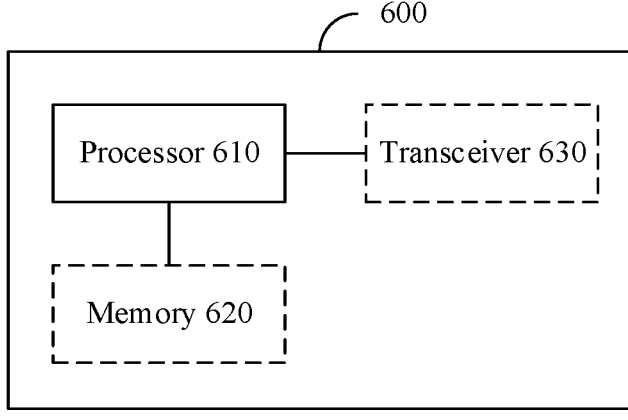
FIG. 12 is a schematic diagram of a structure of a communication apparatus according to an embodiment of this application.

It should be further understood that the transceiver unit 410 in the terminal device may correspond to a transceiver 630 in a terminal device shown in FIG. 12, and the processing unit 420 in the terminal device may correspond to a processor 610 in the terminal device shown in FIG. 12.

It should be further understood that the transceiver unit 410 in the terminal device may be implemented through a communication interface (for example, a transceiver or an input/output interface), and for example, may correspond to the transceiver 630 in the terminal device shown in FIG. 12. The processing unit 420 in the terminal device may be implemented by using at least one processor, and for example, may correspond to the processor 610 in the terminal device shown in FIG. 12. The processing unit 420 in the terminal device may alternatively be implemented by using at least one logic circuit.

Optionally, the terminal device may further include a storage unit. The storage unit may be configured to store instructions or data. The processing unit may invoke the instructions or the data stored in the storage unit, to implement a corresponding operation.

FIG. 11 is a schematic block diagram of another communication apparatus according to an embodiment of this application. The communication apparatus 500 includes a transceiver unit 510 and a processing unit 520. The transceiver unit 510 may communicate with the outside, and the processing unit 520 is configured to perform data processing. The transceiver unit 510 may also be referred to as a communication interface or a communication unit.

The communication apparatus 500 may be a network device. The transceiver unit 510 is configured to perform a receiving or sending operation of the network device in the foregoing method embodiments, and the processing unit 520 is configured to perform an internal processing operation of the network device in the foregoing method embodiments.

Optionally, the communication apparatus 500 may further include a storage unit. The storage unit may be configured to store instructions and/or data. The processing unit 520 may read the instructions and/or the data in the storage unit.

In a design, the transceiver unit 510 is configured to send first scheduled bandwidth threshold information to a terminal device, where a first scheduled bandwidth threshold indicated by the first scheduled bandwidth threshold information meets a first condition, and the first condition includes at least one of the following: modulation symbols of different PTRSs in a PTRS pattern determined based on the first scheduled bandwidth threshold correspond to different mapping locations, modulation symbols of PTRSs of different PTRS groups in the PTRS pattern determined based on the first scheduled bandwidth threshold correspond to discontinuous mapping locations, and a ratio of a total quantity of modulation symbols in the PTRS pattern determined based on the scheduled bandwidth threshold to a quantity of subcarriers in scheduled bandwidth is less than or equal to a first threshold. The total quantity of modulation symbols of the PTRS is a product of a quantity of PTRS groups and a quantity of modulation symbols in the PTRS group, and the scheduled bandwidth is minimum scheduled bandwidth corresponding to the determined PTRS pattern.

Optionally, the transceiver unit 510 is further configured to send scheduled bandwidth information to the terminal device, where the scheduled bandwidth information indicates the scheduled bandwidth.

The transceiver unit 510 is further configured to receive or send an orthogonal frequency division multiplexing OFDM signal, where the OFDM signal includes a PTRS.

The processing unit 520 is configured to determine a PTRS pattern on one OFDM symbol in the OFDM signal based on the scheduled bandwidth threshold, where the PTRS pattern includes at least one PTRS group, and each PTRS group includes at least one modulation symbol.

Optionally, the network device determines the PTRS pattern on the OFDM symbol in the OFDM signal based on the scheduled bandwidth threshold and the scheduled bandwidth. It should be understood that, in addition to the parameters: namely, the scheduled bandwidth threshold and the scheduled bandwidth, the network device may alternatively determine the PTRS pattern based on another parameter, for example, an MCS threshold or an MCS. This is not specifically limited in this application.

Optionally, before the transceiver unit 510 sends the first scheduled bandwidth threshold information to the terminal device, the transceiver unit 510 is further configured to receive second scheduled bandwidth threshold information from the terminal device, where the second scheduled bandwidth threshold information indicates a second scheduled bandwidth threshold, and the second scheduled bandwidth threshold is determined based on a capability of the terminal device. The processing unit 520 is further configured to determine the first scheduled bandwidth threshold based on the second scheduled bandwidth threshold.

Based on the foregoing solution, when configuring the first scheduled bandwidth threshold, the network device may refer to the second scheduled bandwidth threshold reported by the terminal device based on the capability of the terminal device. For example, when chip quality is poor or a phase noise level is poor, the terminal device reports a threshold that may make a larger total quantity of PTRS modulation symbols correspond to the same scheduled bandwidth. In this way, the scheduled bandwidth threshold configured by the network device better matches performance of the current terminal device.

In another design, the transceiver unit 510 is configured to receive or send an orthogonal frequency division multiplexing OFDM signal, where the OFDM signal includes a PTRS. The processing unit 520 is configured to determine a first PTRS pattern on one OFDM symbol in the OFDM signal based on a third scheduled bandwidth threshold, where the first PTRS pattern meets a second condition, and the second condition includes at least one of the following: modulation symbols of different PTRSs in the first PTRS pattern correspond to different mapping locations, modulation symbols of PTRSs in different PTRS groups in the first PTRS pattern correspond to discontinuous mapping locations, and a ratio of a total quantity of modulation symbols in the first PTRS pattern to a quantity of subcarriers in scheduled bandwidth is less than or equal to a first threshold. The total quantity of modulation symbols of the PTRS is a product of a quantity of PTRS groups and a quantity of modulation symbols in the PTRS group, and the scheduled bandwidth is bandwidth allocated by the network device to a terminal device.

Optionally, the network device determines the first PTRS pattern on the orthogonal frequency division multiplexing OFDM symbol in the OFDM signal based on the scheduled bandwidth threshold and the scheduled bandwidth. It should be understood that, in addition to the parameters: namely, the scheduled bandwidth threshold and the scheduled bandwidth, the network device may alternatively determine the PTRS pattern based on another parameter, for example, an MCS threshold or an MCS. This is not specifically limited in this application.

The third scheduled bandwidth threshold may be determined based on an existing protocol. When determining the PTRS pattern, the network device needs to ensure that the PTRS pattern on the OFDM symbol in the OFDM signal meets the second condition, so that the network device does not have a fuzzy behavior when determining the PTRS pattern, demodulation performance can be ensured, and spectral efficiency can be improved.

Optionally, the processing unit 520 is further configured to determine a second PTRS pattern based on the third scheduled bandwidth threshold and the scheduled bandwidth. When the second PTRS pattern does not meet the second condition, the processing unit 520 is further configured to determine the first PTRS pattern on the OFDM symbol in the OFDM signal based on the second PTRS pattern, where the first PTRS pattern is obtained by reducing a quantity of PTRS groups in the second PTRS pattern and/or reducing a quantity of modulation symbols in the PTRS group in the second PTRS pattern. The first PTRS pattern may be one PTRS pattern in a PTRS pattern set.

Optionally, when determining that the second PTRS pattern does not meet the second condition, the processing unit 520 sequentially selects patterns in the PTRS pattern set in descending order until the first PTRS pattern that meets the second condition is obtained, or the processing unit determines, based on the scheduled bandwidth, a total quantity of modulation symbols of the PTRS that meets the second condition, and then selects the first PTRS pattern corresponding to a maximum quantity of PTRS modulation symbols that is less than or equal to the total quantity of modulation symbols.

In still another design, the processing unit 520 is configured to determine a first overhead of a PTRS, where the first overhead of the PTRS is determined based on a total quantity of modulation symbols of the PTRS, a quantity of resource blocks scheduled for a terminal device, and a symbol-level time domain density of the PTRS, and the total quantity of modulation symbols of the PTRS is a product of a quantity of PTRS groups and a quantity of modulation symbols in the PTRS group. When the first overhead of the PTRS is greater than a second threshold, the processing unit determines a second overhead of the PTRS based on the first overhead of the PTRS. The processing unit is further configured to determine, based on an overhead of a demodulation reference signal (demodulation reference signal, DMRS), a comprehensive overhead of a higher layer signaling configuration, and the second overhead of the PTRS, a quantity of first resource elements to which an orthogonal frequency division multiplexing OFDM signal is mapped.

Optionally, the quantity of first resource elements may be determined according to the following relational expression:

$$N_{RE} = N_{sc}^{RB} \times N_{symb}^{sh} - N_{DMRS}^{PRB} - N_{oh}^{PRB} - N_{PTRS}^{PRB}$$

$N_{RE}$ is the quantity of first resource elements, $$N_{sc}^{RB}$$

is a quantity of subcarriers included in one resource block RB, $$N_{DMRS}^{PRB}$$

is the overhead of the DMRS, $$N_{oh}^{PRB}$$

is the comprehensive overhead of the higher layer signaling configuration, and $$N_{PTRS}^{PRB}$$

is the second overhead of the PTRS.

Optionally, the second overhead of the PTRS is the first overhead of the PTRS or a quantization overhead of the PTRS, and the quantization overhead of the PTRS is determined based on the first overhead of the PTRS and a quantization interval.

Figure 13:
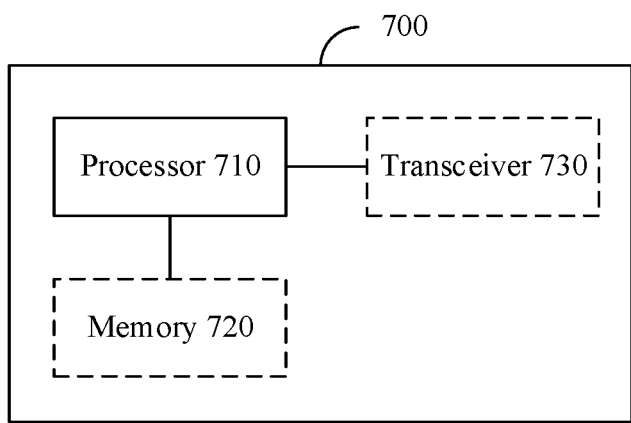
FIG. 13 is a schematic diagram of a structure of another communication apparatus according to an embodiment of this application.

It should be further understood that the transceiver unit 510 in the network device may correspond to a transceiver 730 in a network device shown in FIG. 13, and the processing unit 520 in the network device may correspond to a processor 710 in the network device shown in FIG. 13. Optionally, the network device may further include a storage unit. The storage unit may be configured to store instructions or data. The processing unit may invoke the instructions or the data stored in the storage unit, to implement a corresponding operation.

It should be further understood that the transceiver unit 510 in the network device may be implemented through a communication interface (for example, a transceiver or an input/output interface), and for example, may correspond to the transceiver 730 in the network device shown in FIG. 13. The processing unit 520 in the network device may be implemented by using at least one processor, and for example, may correspond to the processor 710 in the network device shown in FIG. 13. The processing unit 520 in the network device may be implemented by using at least one logic circuit.

As shown in FIG. 12, an embodiment of this application further provides a communication apparatus 600. The communication apparatus 600 includes a processor 610. The processor 610 is coupled to a memory 620. The memory 620 is configured to store a computer program or instructions and/or data. The processor 610 is configured to execute the computer program or the instructions and/or the data stored in the memory 620, so that the method in the foregoing method embodiments is performed.

Optionally, the communication apparatus 600 includes one or more processors 610.

Optionally, as shown in FIG. 12, the communication apparatus 600 may further include the memory 620.

Optionally, the communication apparatus 600 may include one or more memories 620.

Optionally, the memory 620 may be integrated with the processor 610, or separately disposed.

Optionally, as shown in FIG. 12, the communication apparatus 600 may further include a transceiver 630, and the transceiver 630 is configured to receive and/or send a signal. For example, the processor 610 is configured to control the transceiver 630 to receive and/or send the signal.

In a solution, the communication apparatus 600 is configured to implement an operation performed by the terminal device in the foregoing method embodiments.

For example, the processor 610 is configured to implement a processing operation performed by the terminal device in the foregoing method embodiments, and the transceiver 630 is configured to implement a receiving or sending operation performed by the terminal device in the foregoing method embodiments. The processing unit 420 in the apparatus 400 may be the processor in FIG. 12, and the transceiver unit 410 may be the transceiver in FIG. 12. For a specific operation performed by the processor 610, refer to the foregoing descriptions of the processing unit 420. For an operation performed by the transceiver 630, refer to the descriptions of the transceiver unit 410. Details are not described herein again.

As shown in FIG. 13, an embodiment of this application further provides a communication apparatus 700. The communication apparatus 700 includes a processor 710. The processor 710 is coupled to a memory 720. The memory 720 is configured to store a computer program or instructions and/or data. The processor 710 is configured to execute the computer program or the instructions and/or the data stored in the memory 720, so that the method in the foregoing method embodiments is performed.

Optionally, the communication apparatus 700 includes one or more processors 710.

Optionally, as shown in FIG. 13, the communication apparatus 700 may further include the memory 720.

Optionally, the communication apparatus 700 may include one or more memories 720.

Optionally, the memory 720 may be integrated with the processor 710, or separately disposed.

Optionally, as shown in FIG. 13, the communication apparatus 700 may further include a transceiver 730, and the transceiver 730 is configured to receive and/or send a signal. For example, the processor 710 is configured to control the transceiver 730 to receive and/or send the signal.

In a solution, the communication apparatus 700 is configured to implement an operation performed by the network device in the foregoing method embodiments. For example, the processor 710 is configured to implement an operation performed inside the network device in the foregoing method embodiments, and the transceiver 730 is configured to implement a receiving or sending operation performed by the network device in the foregoing method embodiments. The processing unit 520 in the apparatus 500 may be the processor in FIG. 13, and the transceiver unit 510 may be the transceiver 730 in FIG. 13. For a specific operation performed by the processor 710, refer to the foregoing descriptions of the processing unit 520. For an operation performed by the transceiver 730, refer to the descriptions of the transceiver unit 510. Details are not described herein again.

An embodiment of this application further provides a computer-readable storage medium. The computer-readable storage medium stores computer instructions for implementing the method performed by the network device or the terminal device in the foregoing method embodiments.

For example, when the computer instructions are executed by a computer, the computer is enabled to implement the method performed by the network device or the terminal device in the foregoing method embodiments.

An embodiment of this application further provides a computer program product including instructions. When the instructions are executed by a computer, the computer is enabled to implement the method performed by the network device or the terminal device in the foregoing method embodiments.

An embodiment of this application further provides a communication system. The communication system includes the network device and the terminal device in the foregoing embodiments.

For explanations and beneficial effects of related content in any communication apparatus provided above, refer to the corresponding method embodiments provided above. Details are not described herein again.

In embodiments of this application, the network device or the terminal device may include a hardware layer, an operating system layer running above the hardware layer, and an application layer running above the operating system layer. The hardware layer may include hardware such as a central processing unit (central processing unit, CPU), a memory management unit (memory management unit, MMU), and a memory (which is also referred to as a main memory). An operating system at the operating system layer may be any one or more computer operating systems that implement service processing through a process (process), for example, a Linux operating system, a Unix operating system, an Android operating system, an iOS operating system, or a Windows operating system. The application layer may include applications such as a browser, an address book, word processing software, and instant messaging software.

A specific structure of an execution body of the method provided in embodiments of this application is not particularly limited in embodiments of this application, provided that a program that records code of the method provided in embodiments of this application can be run to perform communication according to the method provided in embodiments of this application. For example, the execution body of the method provided in embodiments of this application may be the network device or the terminal device, or a functional module that is in the network device or the terminal device and that can invoke and execute the program.

Aspects or features of this application may be implemented as a method, an apparatus, or a product that uses standard programming and/or engineering technologies. The term "product" used in this specification may cover a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (compact disc, CD) or a digital versatile disc (digital versatile disc, DVD)), a smart card, and a flash memory component (for example, an erasable programmable read-only memory (erasable programmable read-only memory, EPROM), a card, a stick, or a key drive).

Various storage media described in this specification may indicate one or more devices and/or other machine-readable media that are configured to store information. The term "machine-readable media" may include but is not limited to a wireless channel and various other media that can store, include, and/or carry instructions and/or data.

It may be understood that the processor mentioned in embodiments of this application may be a central processing unit (central processing unit, CPU), or may be another general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or transistor logic device, a discrete hardware component, or the like. The general-purpose processor may be a microprocessor, or the processor may be any conventional processor or the like.

It may be further understood that the memory mentioned in embodiments of this application may be a volatile memory or a non-volatile memory, or may include a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM). For example, the RAM may be used as an external cache. As an example instead of a limitation, the RAM may include the following plurality of forms: a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that when the processor is a general-purpose processor, a DSP, an ASIC, an FPGA or another programmable logic device, a discrete gate or a transistor logic device, or a discrete hardware component, the memory (a storage module) may be integrated into the processor.

It should further be noted that the memory described in this specification is intended to include but not limited to these memories and any memory of another appropriate type.

A person of ordinary skill in the art may be aware that, in combination with the examples described in embodiments disclosed in this specification, units and steps may be implemented by electronic hardware or a combination of computer software and electronic hardware. Whether the functions are performed by hardware or software depends on a particular application and a design constraint condition of the technical solutions. A person skilled in the art may use different methods to implement the described functions for each particular application, but it should not be considered that the implementation goes beyond the protection scope of this application.

It may be clearly understood by a person skilled in the art that, for the purpose of convenient and brief description, for a specific working process of the foregoing apparatus and unit, refer to a corresponding process in the foregoing method embodiments. Details are not described herein again.

In several embodiments provided in this application, it should be understood that the disclosed apparatus and method may be implemented in another manner. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of embodiments.

In addition, functional units in embodiments of this application may be integrated into one unit, each of the units may exist alone physically, or two or more units may be integrated into one unit.

All or some of the foregoing embodiments may be implemented by software, hardware, firmware, or any combination thereof. When software is used to implement embodiments, all or some of embodiments may be implemented in a form of a computer program product. The computer program product includes one or more computer instructions. When the computer program instructions are loaded and executed on a computer, the procedures or functions according to embodiments of the present disclosure are all or partially generated. The computer may be a general-purpose computer, a dedicated computer, a computer network, or another programmable apparatus. For example, the computer may be a personal computer, a server, a network device, or the like. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium, a semiconductor medium (for example, a solid state disk (solid state disk, SSD)), or the like. For example, the usable medium may include but is not limited to any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:

receiving, by a terminal device from a network device, first scheduled bandwidth threshold information indicating a first scheduled bandwidth threshold that meets a first condition, wherein the first condition is that a ratio of a total quantity of modulation symbols in a phase tracking reference signal (PTRS) pattern determined based on the first scheduled bandwidth threshold to a quantity of subcarriers in scheduled bandwidth is less than or equal to a first threshold, wherein the total quantity of modulation symbols of the PTRS pattern is a product of a quantity of PTRS groups and a quantity of modulation symbols in a PTRS group, and the scheduled bandwidth is minimum scheduled bandwidth corresponding to the PTRS pattern; and determining, by the terminal device, a first PTRS pattern on one orthogonal frequency division multiplexing (OFDM) symbol in an OFDM signal based on the scheduled bandwidth threshold, wherein the first PTRS pattern comprises at least one PTRS group, and each PTRS group comprises at least one modulation symbol.

2. The method of claim 1, wherein before the receiving, by the terminal device from the network device, the first scheduled bandwidth threshold information, the method further comprises:

determining, by the terminal device, a second scheduled bandwidth threshold based on a capability of the terminal device; and sending, by the terminal device to the network device, second scheduled bandwidth threshold information indicating the second scheduled bandwidth threshold.

3. A method, comprising:

determining, by a terminal device, a first phase tracking reference signal (PTRS) pattern on one orthogonal frequency division multiplexing (OFDM) symbol in an OFDM signal based on a third scheduled bandwidth threshold, wherein the first PTRS pattern meets a second condition, the second condition is that a ratio of a total quantity of modulation symbols in the first PTRS pattern to a quantity of subcarriers in scheduled bandwidth is less than or equal to a first threshold, the first PTRS pattern comprises at least one PTRS group, and each PTRS group comprises at least one modulation symbol, wherein the total quantity of modulation symbols of the PTRS pattern is a product of a quantity of PTRS groups and a quantity of modulation symbols in a PTRS group, and the scheduled bandwidth is bandwidth allocated by a network device to the terminal device.

4. The method of claim 3, wherein the determining, by the terminal device, the first PTRS pattern on one OFDM symbol in the OFDM signal based on the third scheduled bandwidth threshold and scheduled bandwidth comprises:

determining, by the terminal device, a second PTRS pattern based on the third scheduled bandwidth threshold and the scheduled bandwidth, wherein the second PTRS pattern does not meet the second condition; and determining, by the terminal device, the first PTRS pattern on the one OFDM symbol in the OFDM signal based on the second PTRS pattern, wherein the first PTRS pattern is obtained by reducing a quantity of PTRS groups in the second PTRS pattern and/or reducing a quantity of modulation symbols in the PTRS group in the second PTRS pattern.

5. A method, comprising:

determining, by a network device, a first phase tracking reference signal (PTRS) pattern on one orthogonal frequency division multiplexing (OFDM) symbol in an OFDM signal based on a third scheduled bandwidth threshold, wherein the first PTRS pattern meets a second condition, the second condition is that a ratio of a total quantity of modulation symbols in the first PTRS pattern to a quantity of subcarriers in scheduled bandwidth is less than or equal to a first threshold, the first PTRS pattern comprises at least one PTRS group, and each PTRS group comprises at least one modulation symbol, wherein the total quantity of modulation symbols of the first PTRS pattern is a product of a quantity of PTRS groups and a quantity of modulation symbols in a PTRS group, and the scheduled bandwidth is bandwidth allocated by the network device to a terminal device.

6. The method of claim 5, wherein the determining, by the network device, the first PTRS pattern on one OFDM symbol in the OFDM signal based on the third scheduled bandwidth threshold and scheduled bandwidth comprises:

determining, by the network device, a second PTRS pattern based on the third scheduled bandwidth threshold and the scheduled bandwidth, wherein the second PTRS pattern does not meet the second condition; and determining, by the network device, the first PTRS pattern on the one OFDM symbol in the OFDM signal based on the second PTRS pattern, wherein the first PTRS pattern is obtained by reducing a quantity of PTRS groups in the second PTRS pattern and/or reducing a quantity of modulation symbols in the PTRS group in the second PTRS pattern.

* * * * *